US012775528B2

(12) United States Patent
Kharatishvili et al.

(10) Patent No.: US 12,775,528 B2
(45) Date of Patent: Oct. 27, 2026

(54) SCALABLE RECOVERY FOR RECORD-AWARE DISTRIBUTED STORAGE SYSTEMS

(71) Applicant: Amazon Technologies, Inc., Seattle, WA (US)

(72) Inventors: Tengiz Kharatishvili, Issaquah, WA (US); Norbert Paul Kusters, Redmond, WA (US); Yan Leshinsky, Seattle, WA (US); Alexandre Olegovich Verbitski, Woodinville, WA (US); James M Corey, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/759,350

(22) Filed: Jun. 28, 2024

(65) Prior Publication Data

US 2026/0003745 A1 Jan. 1, 2026

(51) Int. Cl.

| | |
|---|---|
| ***G06F 7/00*** | (2006.01) |
| ***G06F 11/1446*** | (2026.01) |
| ***G06F 11/1474*** | (2026.01) |
| ***G06F 16/23*** | (2019.01) |
| ***G06F 17/00*** | (2019.01) |

(52) U.S. Cl.

CPC ...... *G06F 11/1474* (2013.01); *G06F 11/1469* (2013.01); *G06F 16/2379* (2019.01); *G06F 2201/80* (2013.01)

(58) Field of Classification Search

None

See application file for complete search history.

(56) References Cited

U.S. PATENT DOCUMENTS

| | | | |
|---|---|---|---|
| 5,544,357 | A | 8/1996 | Huei |
| 6,311,186 | B1 | 10/2001 | MeLampy |
| 6,457,021 | B1 | 9/2002 | Berkowitz |
| 7,747,565 | B2 | 6/2010 | Harris |
| 7,747,589 | B2 | 6/2010 | Lomet |
| 9,043,278 | B1 | 5/2015 | Wilson |
| 9,286,001 | B2 | 3/2016 | Skjolsvold |
| 9,323,569 | B2 | 4/2016 | Vermeulen |
| 10,108,669 | B1 | 10/2018 | Krishnamoorthy |

(Continued)

OTHER PUBLICATIONS

U.S. Appl. No. 18/759,410, filed Jun. 28, 2024, Tengiz Kharatishvili, et al.

(Continued)

*Primary Examiner* — Tuan A Pham

(74) *Attorney, Agent, or Firm* — S. Scott Foster; Kowert, Hood, Munyon, Rankin & Goetzel, P.C.

(57) ABSTRACT

Scalable recovery of a database is performed by a distributed data store. Storage nodes can monitor connection status of database access applications that have attached respective portions of a table stored at the storage nodes to provide access to the table. A connection failure of a database access application can be detected. Transactions associated with the failed database access application can be identified and determination of transactions that are not committed made. The storage nodes can remove versions of records of the table associated with the transaction as part of recovering the respective portions of the table from the connection failure of the database access application.

20 Claims, 21 Drawing Sheets

(56) References Cited

U.S. PATENT DOCUMENTS

| | | | |
|---|---|---|---|
| 10,437,721 | B2 | 10/2019 | Leshinsky |
| 11,030,055 | B2 | 6/2021 | Gupta |
| 11,200,213 | B1 | 12/2021 | Courchaine |
| 11,341,001 | B1 | 5/2022 | Brahmadesam |
| 11,726,743 | B2 | 8/2023 | Lieber-Dembo |
| 12,166,858 | B2 | 12/2024 | Komandur |
| 2008/0307012 | A1 | 12/2008 | Lomet |
| 2011/0184915 | A1 | 7/2011 | Wu |
| 2014/0040276 | A1 | 2/2014 | Chen |
| 2014/0208217 | A1 | 7/2014 | Carasso |
| 2014/0279930 | A1* | 9/2014 | Gupta .................. G06F 11/1464 707/683 |
| 2015/0081694 | A1 | 3/2015 | Friedlander |
| 2015/0154269 | A1 | 6/2015 | Miller |
| 2015/0242531 | A1 | 8/2015 | Rodniansky |
| 2016/0092496 | A1 | 3/2016 | Dietterich |
| 2016/0147449 | A1 | 5/2016 | Andrei |
| 2016/0378676 | A1 | 12/2016 | Uriel |
| 2017/0357577 | A1 | 12/2017 | Lee |
| 2018/0165469 | A1 | 6/2018 | Ks |
| 2018/0268321 | A1 | 9/2018 | Leafty |
| 2019/0007206 | A1* | 1/2019 | Surla ........................ H04L 63/10 |
| 2019/0236598 | A1 | 8/2019 | Padmanabhan |
| 2021/0109922 | A1 | 4/2021 | Mahadik |
| 2021/0286801 | A1 | 9/2021 | Peng |
| 2022/0229837 | A1 | 7/2022 | Pesala |
| 2022/0391376 | A1 | 12/2022 | Helland |
| 2023/0020330 | A1* | 1/2023 | Schwerin .............. G06F 16/256 |
| 2023/0021150 | A1 | 1/2023 | VanBenschoten |
| 2024/0104229 | A1 | 3/2024 | Venkatesan |
| 2024/0394224 | A1 | 11/2024 | Diaconu |

OTHER PUBLICATIONS

U.S. Appl. No. 18/759,403, filed Jun. 28, 2024, Tengiz Kharatishvili, et al.

U.S. Appl. No. 18/759,387, filed Jun. 28, 2024, Tengiz Kharatishvili, et al.

U.S. Appl. No. 18/759,370, filed Jun. 28, 2024, Tengiz Kharatishvili, et al.

Martin Kleppmann, "Designing Data-Intensive Applications," Mar. 2017, Retrieved from the Internet: URL:https://unidel.edu.ng/focelibrary/books/Designing%20Data-Intensive%20Applications%20The%20Big%20Ideas%20Behind%20Reliable,%20Scalable,%20and%20Maintainable%20Systems%20by%20Martin%20Kleppmann%20(z-lib.org).pdf.

International Search Report and Written Opinion mailed Oct. 9, 2025 in PCT/US2025/035502, Amazon Technologies, Inc., 12 pages.

* cited by examiner

SCALABLE RECOVERY FOR RECORD-AWARE DISTRIBUTED STORAGE SYSTEMS

BACKGROUND

Commoditization of computer hardware and software components has led to the rise of service providers that provide computational and storage capacity as a service. At least some of these services (e.g., database services) may be distributed in order to scale the processing capacity of the service and increase service availability. The distribution of workload of services may result in uneven work performed across the service.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Figure 1:
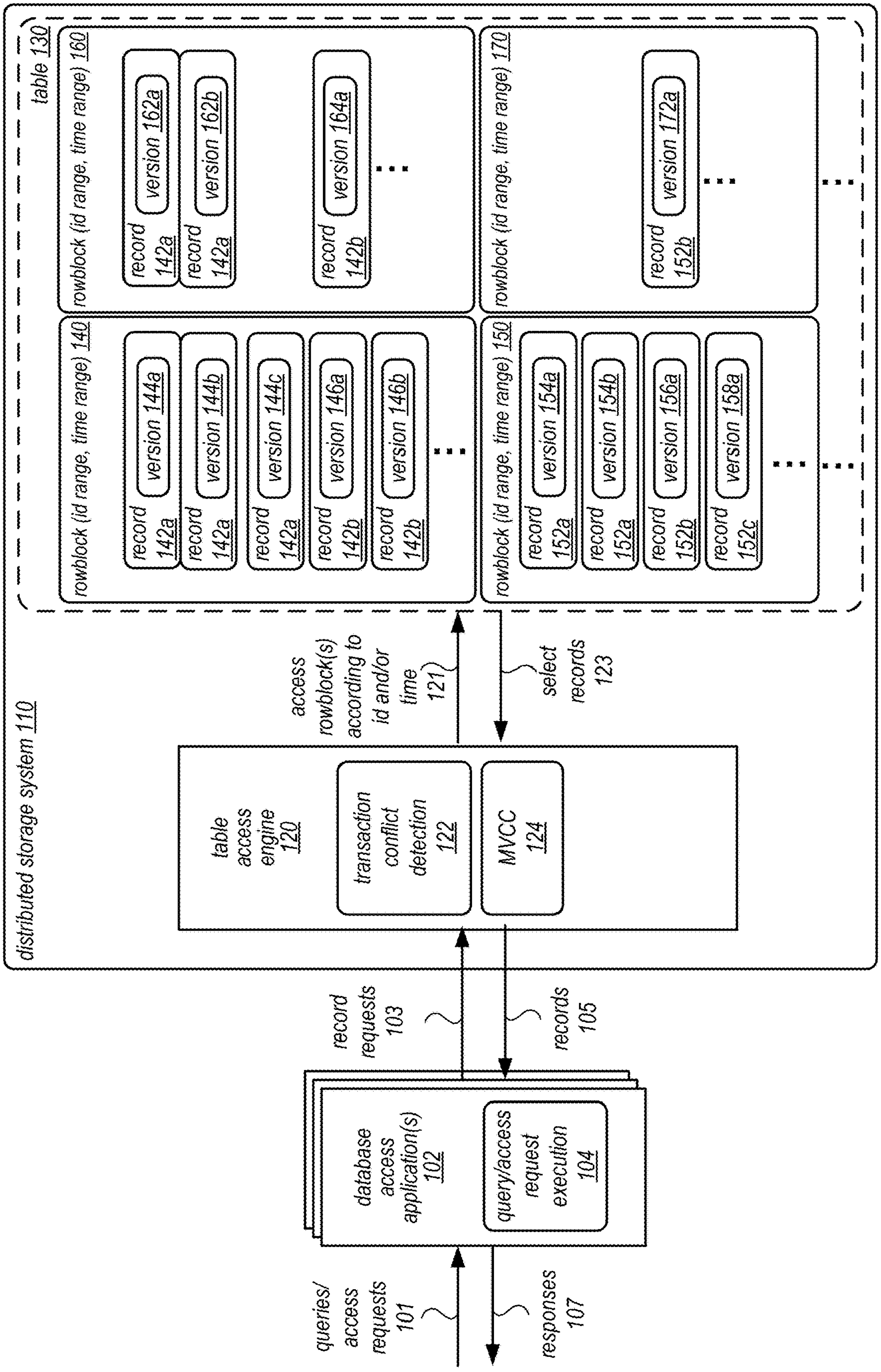
FIG. 1 is a logical block diagram illustrating a record-aware distributed storage system that provides access to records for different database access applications, according to some embodiments.

Techniques for a record-aware distributed data storage system are described herein. FIG. 1 is a logical block diagram illustrating record-aware distributed storage system that provides access to records for different database access applications, according to some embodiments. Database access application(s) 102 may be various different types of database systems (e.g., database management systems, database access or request handling systems) that provide access to different types of databases, such as the different types of databases discussed below with regard to FIG. 3. For example, different database access application(s) 102 may provide access to key-value data stores, graph databases, object-based data stores, time-series databases, relational databases, non-relational databases, and/or document databases, among others. For example, client applications may use established connections with database access application(s) 102, either directly or through one or more other applications, request routers, or proxies, in some embodiments, to submit queries/access requests 101 to database access application(s) 102. In some embodiments, client applications may submit requests without connections using, for example, Rest-style, or other Application Programming Interface (API) commands, to submit queries/access requests 101 to database access application(s) 102.

In some embodiments, database access application(s) 102 may implement various query/access request execution features 104 in order to perform queries or access requests 101 received from different clients of the database access applications, which may vary according to the different types of databases being accessed and/or the database access application(s) 102 being used. According to the received queries/access requests, database access application(s) 102 may determine which records to retrieve from a data set, such as table 130. Database access application(s) 102 may send requests for records 103 to distributed storage system 110 which may be record-aware in order to perform record requests 103. Distributed storage system 110 may be record-aware, implementing table access engine 120 to provide "record-level" (which may alternatively be referred to as "row-level") processing of record requests.

For example, table access engine 120 may be able to access a table 130, which is stored in one or more rowblocks, such as rowblocks 140, 150, 160 and 170. Each record of a rowblock, such as records 142*a*, 142*b*, 152*a*, 152*b*, and 152*c* may have different versions maintained in rowblock 140, so that each version, such as versions 144*a*, 144*b*, 144*c*, 146*a*, 146*b*, 154*a*, 154*b*, 156*a*, and 158*a*, may corresponding to a different version of the record maintained over time. As discussed in detail below, each rowblock may store a range of records (e.g., according to a primary key or other record identifier) within a range of time (e.g., indicated by version, which may be a timestamp determined according to a global time synchronization service, as discussed below with regard to FIG. 2). In this way, some records may be stored in multiple rowblocks, according to their respective version (e.g., time value). For example, rowblock 160 may store versions of records 142*a* and 142*b*. However, these versions, 162*a*, 162*b*, and 164*a*, may be associated with different time values that are within the time range of rowblock 160. Likewise, rowblock 170 may store record 152*b*, but version 172*a*. In various embodiments, distributed storage system 110 may implement a copy-on-write technique, such that when a record is written to, a new version is created that is updated according to the write (instead of overwriting the same record). In this way, different record versions are preserved over time and stored in their corresponding rowblock based on the record identifier and time of write, in some embodiments.

Using rowblocks as the unit of storage for table access engine 120 in distributed storage system 110 supports several performance improvements. Individual records (e.g., rows, items, or other discrete objects storing one or more data values, fields, or data), can be accessed using table access engine 120 (e.g., by using a storage engine API that supports record-specific reads and writes). However, because records are still grouped into larger rowblocks, rowblocks can be efficiently cached, compressed, and managed in different ways, discussed in detail below. In some embodiments, a rowblock may be a leaf node of an index structure used to organize or locate records in table 130. In some embodiments, rowblocks can be accessed by a respective rowblock number. Moreover, because rowblocks have an associated row identifier range and time value range, the rowblock numbers can be mapped to corresponding ranges of time and ranges of row identifier, allowing distributed storage system 110 to "understand" what versions of a record exist, what times they correspond to, and the ability to implement features such as transaction conflict detection 122 and multiversion concurrency control (MVCC) 124, discussed in detail below. This is an improvement over techniques where a page or other unit of storage for database records is mapped to by a number with no understanding of what versions of a record exist or what times they correspond to, which places the burden of transaction conflict detection and MVCC onto database access applications.

The of ability of distributed storage system 100 to be record-aware also allows for distributed storage system to implement other data management operations. For example, table access engine 120 can assume data management responsibilities from database access application(s) 102, such as garbage collection to vacuum deleted records and perform undo techniques to remove records for versions of records in transactions that failed to commit and had to be rolled-back. This allows database access application(s) 102 to increase performance, as the number of operations and requests to be sent to distributed storage system 110 can be significantly reduced (e.g., the number of steps to perform a single write as a transaction can be reduced or database recovery can occur simply by restarting a database access application 102 and reattaching it to one or more recovered storage units (such as silos discussed in detail below). Because table access engine 120 can implement transaction conflict detection 122 and MVCC 124, table access engine can access 121 rowblocks and select 123 the visible records according to MVCC rules to provide as records 105 to database access applications 102, reducing the computational burden to complete processing of a query or access request and provide responses 107 at database access applications 102.

Please note, FIG. 1 is provided as a logical illustration of database access applications and a distributed storage system, and is not intended to be limiting as to the physical arrangement, size, or number of components, modules, or devices to implement such features. In some embodiments, table access engine 120, for example, may be implemented be implemented as a "client-side" component, such as storage service engine 323 discussed below with regard to FIG. 3, although it is still a part of distributed storage system 110.

The specification continues with a description of an example network-based database service that uses as a separate back-end storage system, a record-aware storage service. Included in the description are various aspects of the example network-based database service, such as a data access node, and a record-aware storage service. The specification then describes flowcharts of various embodiments of methods for implementing and using a record-aware distributed data storage system. Next, the specification describes an computer example system that may implement the disclosed techniques. Various examples are provided throughout the specification.

Figure 2:
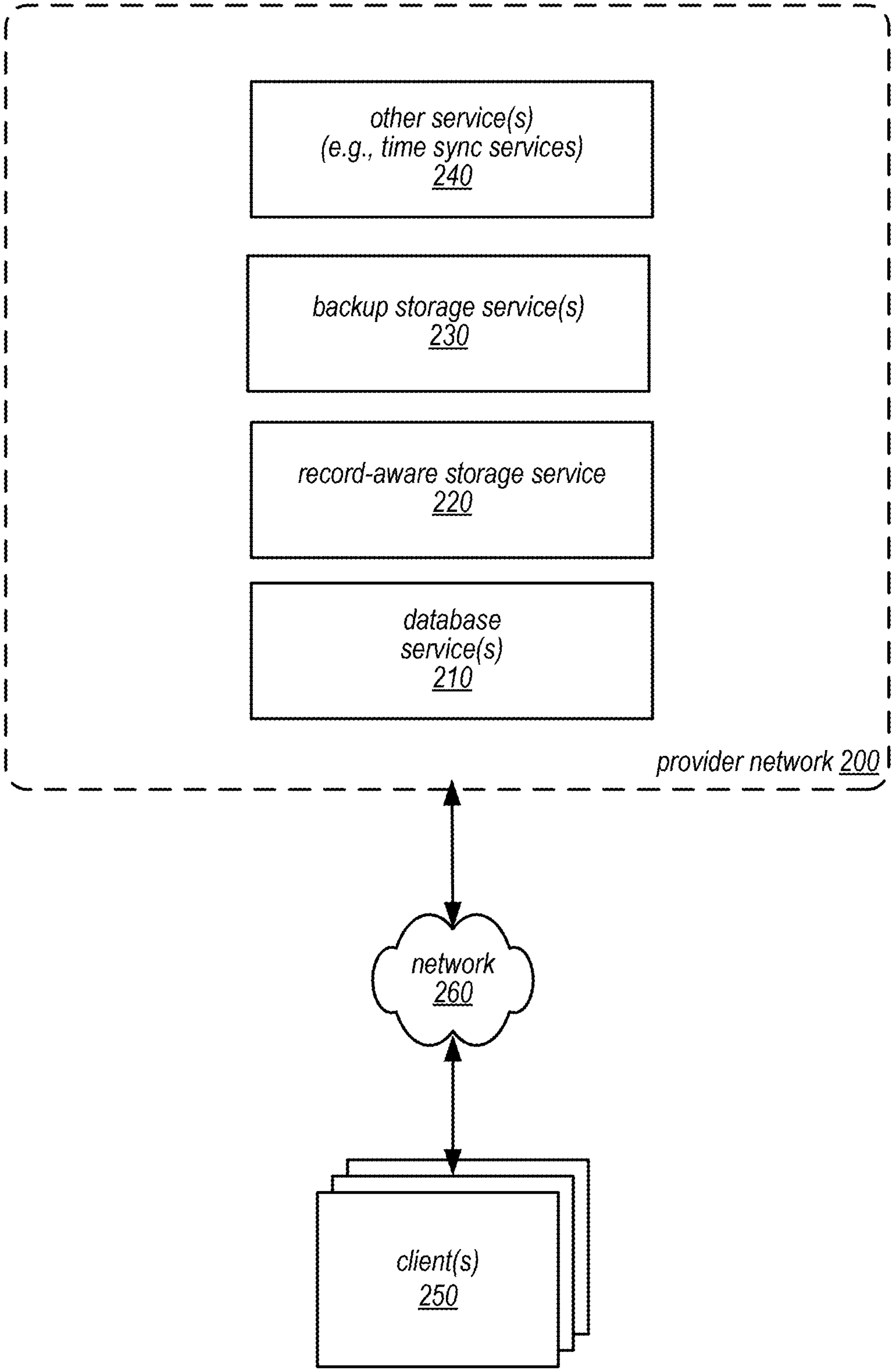
FIG. 2 is a block diagram illustrating a provider network that may implement different database services that utilize a record-aware data storage service to provide access to different databases, according to some embodiments.

FIG. 2 is a block diagram illustrating a provider network that may implement different database services that utilize a record-aware data storage service to provide access to different databases, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 3000 described below with regard to FIG. 17), needed to implement and distribute the infrastructure and storage services offered by the provider network within the provider network regions.

For example, provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In the illustrated embodiment, a number of clients (shown as clients 250 may interact with a provider network 200 via a network 260. Provider network 200 may implement respective instantiations of the same (or different) services, a database services 210, other services 240, a record-aware storage service 220 and/or one or more other backup storage services 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, record-aware storage service 220, backup storage service(s) 230 and/or other service(s) 250 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database access node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service(s) 210 or record-aware storage service 220 may be internal to a computing system or an enterprise system that provides database services to clients 250, and may not be exposed to external clients (e.g., users or client applications). In such embodiments, the internal "client" (e.g., database service 210) may access record-aware storage service 220 over a local or private network (e.g., through an API directly between the systems that implement these services). In such embodiments, the use of record-aware storage service 220 in storing database tables on behalf of clients 250 may be transparent to those clients. In other embodiments, record-aware storage service 220 may be exposed to clients 250 through provider network region to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Note that in various embodiments, different storage policies may be implemented by database service 210 and/or record-aware storage service 220. Examples of such storage policies may include a durability policy (e.g., a policy indicating the number of instances of a database table (or rowblocks thereof, such as a quorum-based policy) that will be stored and the number of different nodes on which they will be stored) and/or a load balancing policy (which may distribute database tables, or data rowblocks thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for rowblocks.

Figure 3:
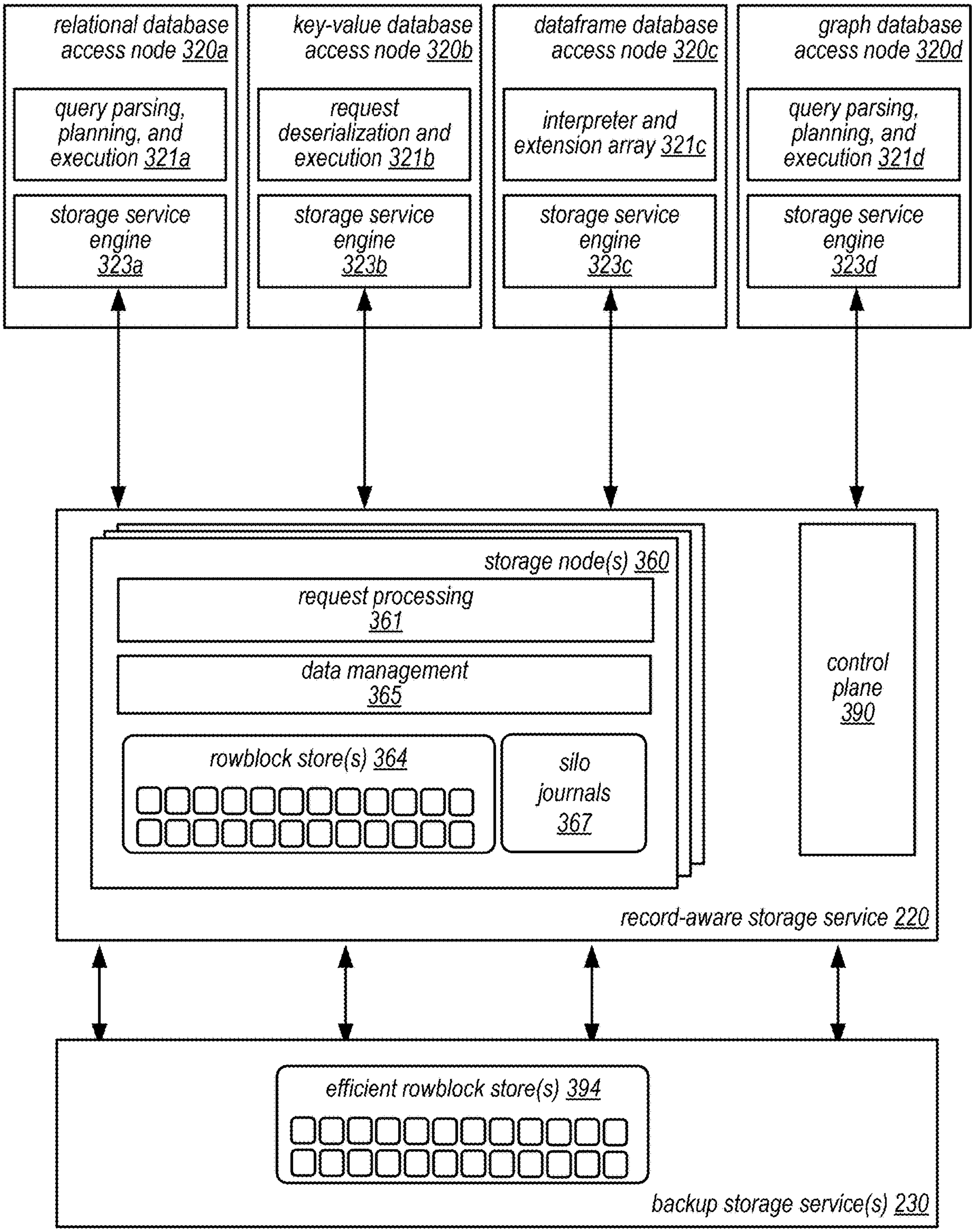
FIG. 3 is a block diagram illustrating various example database access nodes that can use a record-aware storage service to provide access to different types of databases, according to some embodiments.

FIG. 3 is a block diagram illustrating various example database access nodes that can use a record-aware storage service to provide access to different types of databases, according to some embodiments. Different database services 210 may host or implement different database access nodes (sometimes referred to as data access nodes) in order to support different types of database structures, schemas, or styles. In various embodiments, each database service 210 may implement various management features as part of a control plane which may manage the creation, provisioning, deletion, or other features of managing a database hosted in a database service 210. For example, a control plane may monitor the performance of host(s) (e.g., a computing system or device like computing system 3000 discussed below with regard to FIG. 17) that implement database access nodes, such as database access nodes 320*a*, 320*b*, 320*c*, and 320*d* via compute management and/or shard/partition management for high workloads (e.g., heat) and move or data assignments away from some hosts to avoid overburdening host(s). A control plane may handle various management requests, such as request to create databases, manage databases (e.g., by configuring or modifying performance, such as by enabling a "limitless table feature" or other automated management feature in response to a request which may cause resource scaling or other automated management features to be enabled for that system-managed table. A control plane may implement heat management, health monitoring and placement management, as well as overall compute management.

In some embodiments, a database service 210 may implement one or more different types of database systems with respective types of query engines for accessing database data as part of the database. For example, database service 210 may implement various types of connection-based (e.g., having established a network connection between a database client and a router for an endpoint of a database which may route requests to various data access nodes which may, for instance, facilitate the performance of various operations that continue over multiple communications between the database client and data access nodes, or for clustered or other embodiments that distribute transaction performance across multiple access nodes, a connected pool of distributed transaction nodes of distributed transaction management layer.

In some embodiments, database service(s) 210 may implement a fleet of host(s) which may provide, in various embodiments, a multi-tenant configuration so that different data access nodes, such as database access nodes 320*a*, 320*b*, 320*c*, and 320*d*, can provide access to different databases on behalf of different clients over different connections. While hosts(s) may be multi-tenant, each data access node may be provisioned on host(s) in order to implement in-place scaling (e.g., by overprovisioning resources initially and then scaling-based on workload to right-size the capacity that it is recorded as utilized for an account that owns or is associated with the database that is accessed by the data access node). In various embodiments, hosts may implement a single-tenant configuration to host a single database access node for a database or client.

Data access node(s) may support various features for accessing different types of a database. Data access nodes may implement agents, interfaces, or other controls according to the respective type of virtualization used to collect and facilitate communication of utilization metrics for in-place scaling, among other supported aspects of virtualization, such as host management. For example, host management may implement resource utilization measurement, which may capture and/or access utilization information for host(s) to determine which portion of utilization can be attributed to a specific database head node.

As illustrated in FIG. 3, different types of database access nodes (which may be implemented as part of different database services 210) can access record-aware storage service 220. For example, relational database access node 320*a* may support a Structured Query Language (SQL) style interface, implementing a relational database schema, and various operations to perform query parsing, planning, and execution 321*a*, to support Online Transaction Processing (OLTP) and Online Analytical Processing (OLAP). Storage service engine 323*a*, discussed in detail below with regard to FIG. 4, may provide access to and be a "client-side" driver/interface for record-aware storage service 220.

In another example, key-value database access node 320*b* may support a noSQL or other key-value style interface, implementing a semi-structured or non-relational database, and various operations to perform request deserialization and execution 321*b*, to support various styles and/or types of requests, including transactions, and non-transaction requests. Storage service engine 323*b*, discussed in detail below with regard to FIG. 4, may provide access to be and be a "client-side" driver/interface for record-aware storage service 220.

In another example, dataframe database access node 320*c* may support a dataframe style interface, and various operations to perform request interpretation and extension arrays 321*c*, to support various styles and/or types of requests. Storage service engine 323*c*, discussed in detail below with regard to FIG. 4, may provide access to be and be a "client-side" driver/interface for record-aware storage service 220.

In another example, graph database access node 320*d* may support a graph database style interface, and various operations to perform query parsing, planning, and execution 321*d*, to support various styles and/or types of requests to a graph database. Storage service engine 323*d*, discussed in detail below with regard to FIG. 4, may provide access to be and be a "client-side" driver/interface for record-aware storage service 220.

In some embodiments, database data for a database of database service 210 may be stored in a separate record-aware storage service 220. In some embodiments, storage service 220 may be implemented as to store database data as virtual disk or other persistent storage drives. In other embodiments, embodiments, record-aware storage service 220 may store data for databases using rowblock stores 364 along with respective silo journals (e.g., per segment journals maintained for each of the segments in a silo, as discussed in detail below with regard to FIG. 9). Silo journals 367 may store redo log records, which may describe changes made to records of a database table that can be subsequently applied to rowblock store(s) 364 to, for example, create a record in a Record-aware storage service 220 may implement control plane 390, which may implement various management features for storage nodes. In other embodiments, many (or all) of the management features implemented by control plane can be implemented directly on storage node(s) 360.

In some embodiments, data may be organized in various logical volumes, silos, segments, and rowblocks for storage on one or more storage nodes as discussed in detail below with regard to FIG. 9. Request processing 361 may perform various requests received from a storage service engine to access records, such as requests for records sent according to an interface for supported by request processing 361 to retrieve records using both a specified record identifier and time value.

For example, request processing 361 may implement different MVCC rules. MVCC rules may, in some embodiments, be applied to determine what versions of a record are visible to an access request (e.g., what version of a record can be read or written to be a query, update, or transaction). For example, MVCC rules may be applied to determine which version of a record should be provided in response to a record request given a time associated with an access request (sometimes referred to as a snapshot time). An access request may, for instance, be given or associated with a time when it is received at a database access node. The associated time value can then be compared with information maintained at the storage node describing committed (e.g., successfully completed), in progress, or failed updates corresponding to different versions of a records (e.g., corresponding to respective timestamps of the different versions), so that committed version of records that occurs prior to the time associated with the request may be returned, as discussed below with regard to FIG. 16. Different versions or adaptations of MVCC rules may be implemented, in various embodiments. For example, MVCC rules may depend upon transaction protocols, conflict resolution protocols, or other features of transactions or interactions supported by the different database systems or applications.

In some embodiments, a time value may be determined using a time synchronization service (e.g., one of other services 240 of provider network 200), which may use a fleet of redundant satellite-connected and atomic reference clocks in different provider network 200 regions to deliver current time readings of the Coordinated Universal Time (UTC) global standard. A software component (e.g., a daemon) implemented at various client components of the different services of provider network 200 can determine the true time of an event (e.g., when an access request is received or when a timestamp is assigned) using a range of time (e.g., determined using a library such as ClockBound) that can describe the error bound of a hosting component with respect to the true time. In this way, different components across different services (e.g., host systems for database access applications and storage nodes of record-aware storage service 210 can use their own respective true time determinations with respective error bounds to correctly order events (e.g., updates that create different versions of records).

In another example, request processing 361 may implement transaction conflict detection. Transaction status information (e.g., a table or record of transactions corresponding to rowblocks stored on a storage node may be maintained. When a request to prepare a transaction is received, as discussed in detail below with regard to FIGS. 11A-11B and 14, request processing 361 can determine whether another transaction updating or accessing the same records has already sent a prepare request (e.g., by comparing time values associated with the prepare request and any other received prepare requests). If another transaction has already sent a prepare request (and that transaction has not yet committed and thus may not be visible to other transactions sending prepare requests that access a record that has already been prepared), then the latter prepare request may conflict and a failure/conflict indication may be sent in response to the latter prepare request.

Data management 365 may perform various techniques, such as row-block and silo adaptation, recovery, and garbage collection discussed in detail below with regard to FIGS. 7A-10, 12, 13, and 15.

In some embodiments, records (or rowblocks) may be moved (or copied) to one or more backup storage service(s) 230. Backup storage service(s) 230 may implement cost or other optimized storage systems in order store additional copies of rowblocks or other rowblocks as efficient rowblock stores 394. In this way, less frequently access rowblocks (e.g., rowblocks that store records further back in time) or backup copies of rowblocks can be stored in a storage system that may provide storage capacity that utilizes less or different types of computing resources (e.g., slower, but higher capacity disk storage devices instead of faster, lower capacity solid-state storage devices, lower memory or network bandwidth computing resources, less optimized for request processing or data management features, etc.), but can more efficiently store rowblocks (e.g., more cheaply and/or with greater compression). These rowblocks can be retrieved and/or returned to storage node(s) 360 in order to make them accessible for perform access requests. In some embodiments, backup storage service(s) 230 may be directly accessed by database access nodes 320 or other components of database service(s) 210.

As noted above, each database access node may implement a storage service engine to handle or coordinate access to record-aware storage service 220. Because different types of databases can implement a storage service engine, record-aware storage service 210 can be compatible with a wide variety of different database systems and technologies. For example, although many different database systems or technologies may implement different types of schemas, structures, or formats for accessing and interpreting data, underlying these different types of schemas, structures, or formats, may be a table based format that stores data as records (sometimes referred to as rows) in a table. Accordingly, it may be that different database systems can make use of record-aware storage service 220 to serve as the back-end data store for storing data for the different types of databases. Moreover, the various different techniques that can be supported or optimized by record-aware storage service, such as data management techniques to adaptively move data, garbage collect or remove unwanted data, support transactions and MVCC, improve the performance of the different types of database systems and technologies that use record-aware storage service 210 as the back-end data store by offloading these workloads to record-aware storage service 210.

Figure 4:
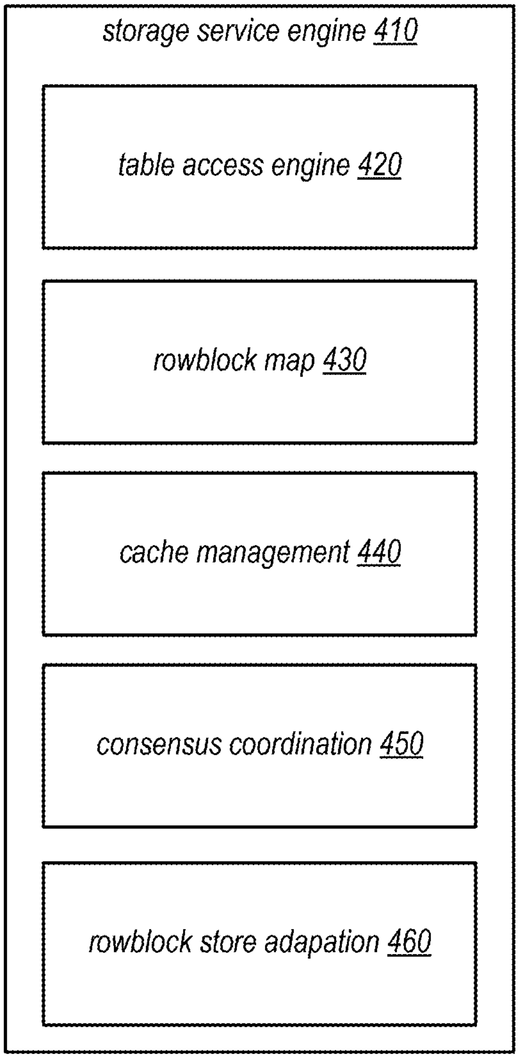
FIG. 4 is a block diagram illustrating a storage service engine, according to some embodiments.

FIG. 4 is a block diagram illustrating a storage service engine, according to some embodiments. Storage service engine 410 may implement a table access engine 420, in some embodiments, to determine where and which records to return in response to a record request. Table access engine 420 may translate record requests into a record-aware storage service interface, in some embodiments, that request processing at storage nodes (e.g., request processing 361 in storage node(s) 360). Record requests may specify both a record identifier (e.g., a key) and a time value (e.g., as timestamp in UTC or other time format), which storage nodes can use identify the corresponding rowblock with the record identifier range and time value range.

In some embodiments, table access engine 420 may implement different MVCC rules (although in some embodiments, MVCC may be applied at storage nodes instead of at storage service engine 410). MVCC rules may, in some embodiments, be applied to determine what versions of a record are visible to an access request (e.g., what version of a record can be read or written to be a query, update, or transaction). For example, MVCC rules may be applied to determine which version of a record should be provided in response to a record request given a time associated with an access request (sometimes referred to as a snapshot time). An access request may, for instance, be given or associated with a time when it is received at a database access node. The associated time value can then be compared with information maintained at the storage node describing committed (e.g., successfully completed), in progress, or failed updates corresponding to different versions of a records (e.g., corresponding to respective timestamps of the different versions), so that committed version of records that occurs prior to the time associated with the request may be returned, as discussed below with regard to FIG. 16. Different versions or adaptations of MVCC rules may be implemented, in various embodiments. For example, MVCC rules may depend upon transaction protocols, conflict resolution protocols, or other features of transactions or interactions supported by the different database systems or applications.

In some embodiments, a time value may be determined using a time synchronization service (e.g., one of other services 240 of provider network 200), which may use a fleet of redundant satellite-connected and atomic reference clocks in different provider network 200 regions to deliver current time readings of the Coordinated Universal Time (UTC) global standard. A software component (e.g., a daemon) implemented at various client components of the different services of provider network 200 can determine the true time of an event (e.g., when an access request is received or when a timestamp is assigned) using a range of time (e.g., determined using a library such as ClockBound) that can describe the error bound of a hosting component with respect to the true time. In this way, different components across different services (e.g., host systems for database access applications and storage nodes of record-aware storage service 210 can use their own respective true time determinations with respective error bounds to correctly order events (e.g., updates that create different versions of records).

In some embodiments, storage service engine may implement rowblock map 430. Rowblock map 430 may store the locations of different rowblocks and their respective records across different silos or other distributions of a database and may implement an index, such as a time-split b-tree. In at least some embodiments, rowblock map 430 may be implemented as a cache, which may be dynamically sized to obtain respective rowblocks containing index data (e.g., root node and interior nodes of a b-tree) as well as accessed leaf nodes (e.g., rowblocks containing records of a table). In at least some embodiments, table data may be indexed using a time-split b-tree. Instead of simply indexing rowblocks based on the record identifiers contained within the rowblock, a time-split b-tree allows for rowblocks to be indexed both by record identifier and time, allowing for quick searches for rowblocks according to record identifier and time value. Moreover, updates to the index easily support for the various rowblock, splits, mergers, recovery, garbage collection, and other adaptations discussed in detail below with regard to FIGS. 7A-10.

In some embodiments, storage service engine 410 may implement cache management 440 to provide cache translation and maintenance, to decouple the storage format of record-aware storage service from different database access nodes. In this way, record-aware storage service 220 can scalably adapt internal data structures and representations according to workload, based on, for example, cost vs performance considerations, and to do this optimization independently of database systems utilizing record-aware storage service 220. For example, database system focusing on simple Online Transaction Processing (OLTP) workloads often wants to lean toward row-oriented layout for the cached records in its main memory, whereas one focused on Online Analytical Processing (OLAP) workloads may prefer to lean toward column-oriented layout. Graph databases may prefer adjacency matrix formats in main memory that are different from any internal format used by record-aware storage service 220.

In various embodiments, cache management 440 may provide translation or updates to database access nodes so that they can respectively maintain updated caches in a desired format (which may be different from a cache that storage engine 410 maintains of rowblocks obtained from storage nodes). For example, database access node can request to be notified when a row block changes. In some embodiments, there may two types of change notifications: invalidations and update recipes. An update recipe will usually reduce bandwidth compared with retransmitting the row block. If the cost of transmitting all the updated records would exceed the cost to send the new (compressed) row block, the storage node may choose to send the whole row block. Another aspect of notification is heartbeats indicating that all unmentioned row blocks in a silo are unchanged over a given time interval.

When subscribing for a particular row block, a priority is given. There is also a bandwidth budget computed jointly between a database access node and silo for that set of row blocks. As the budget gets tight, the database access node communicates this, and the cache maintenance stream adapts by adjusting thresholds A and B. Above threshold A, an update recipe will be sent if appropriate. Between threshold A and B, only invalidation is sent, and below threshold B, nothing is sent (which means the cache must be assumed invalid beyond the last communicated timestamp).

If a database access node is not subscribed but through some other means discovers that its cache needs to be updated, naturally it has the option to manually issue a request to read a row block or an update recipe. Because both the cache and the notifications are timestamped, there may be no confusion as to whether the notifications are applicable to the cache, or whether the cache can be used for a particular query. There is however the possibility that the cache is in an uncertain state and therefore may not be proved to be correct. In that case, it may that query results can be made conditional on a read verification from storage. This may take the form of specifying the timestamp and/or hash of the cached row block and requesting that the silo confirm validity as of the transaction's timestamp. A write to a row block can also be conditioned on the overall prior timestamp of the row block, in addition to the prior timestamps of the rows to be modified, if data cached for the row block was used in the transaction.

In some embodiments, storage service engine 410 may implement consensus coordination 450 to determine whether a read or write successfully achieved consensus (e.g., via quorum protocol). For example, quorum requirements may be applied to determine whether a read (e.g., a request for records) has consensus among different copies (e.g., different segments of a protection group) by determining that a quorum (e.g., 3 out of 4 copies) match. Likewise, quorum requirements may be applied to determine whether a write (e.g., a request to write a redo log describing an update) was acknowledged as successfully completed (e.g., acknowledgments received from 3 out of 4 segments). Quorum requirements may vary according to durability, availability, and other considerations. Consensus coordination 450 may enforce or check that quorum requirements are satisfied, in various embodiments.

In various embodiments, storage service engine 410 may direct or participate in various data management features at storage nodes and may implement rowblock store adaptation 460. Rowblock store adaptation 460 may, as discussed below with regard to FIGS. 7A-7D and 13, direct splits, mergers, or movement of rowblocks in order to balance workload across different storage nodes storing a silo for database.

Figure 5:
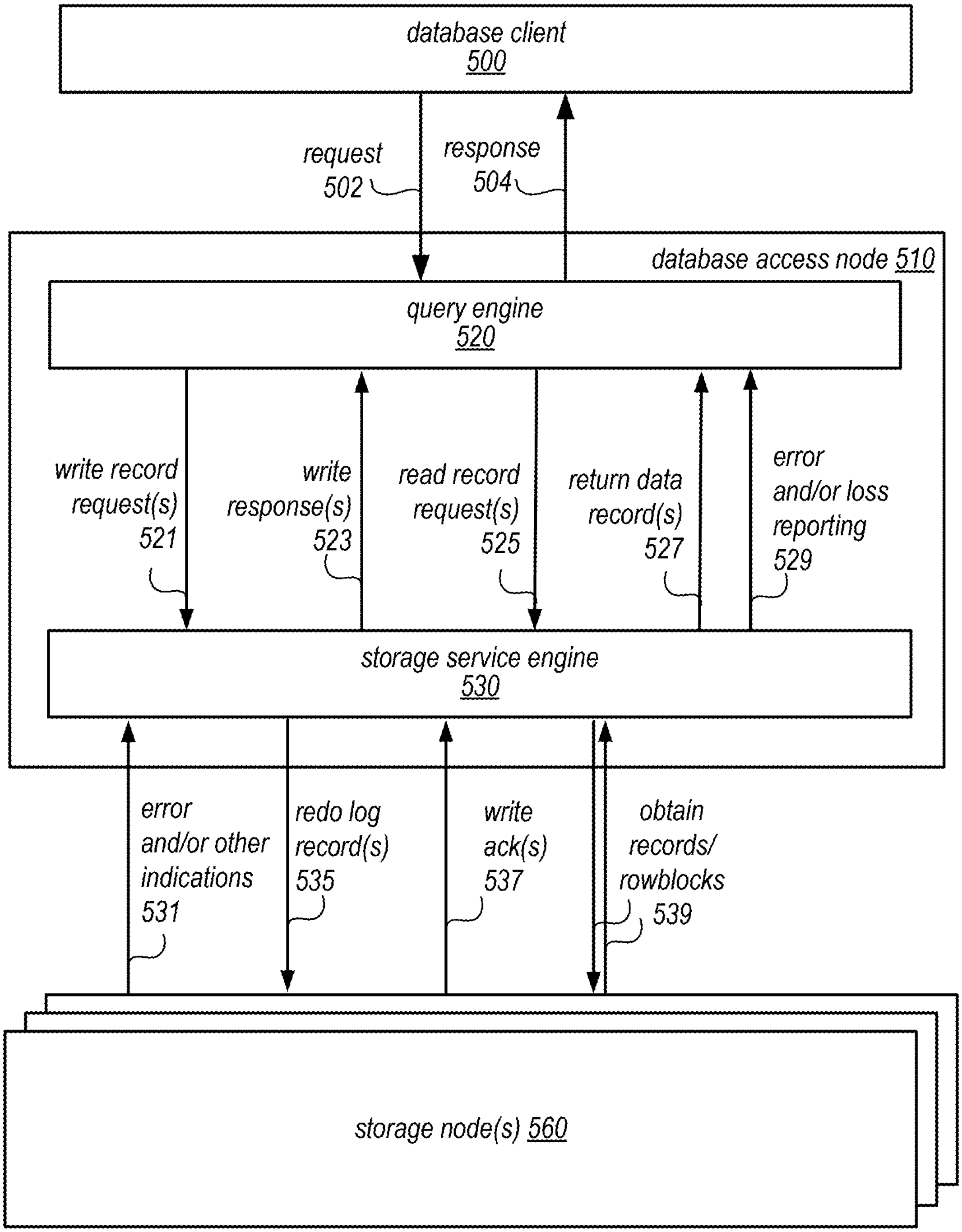
FIG. 5 is a block diagram illustrating various interactions to handle database client requests at a data access node utilizing a storage nodes of a record-aware data storage service, according to some embodiments.

FIG. 5 is a block diagram illustrating various interactions to handle database client requests at a data access node utilizing a storage nodes of a record-aware data storage service, according to some embodiments. In the example database system implemented as part of database service 210, a database access node 510 may be implemented for each database and storage nodes 560 (which may or may not be visible to the clients of the database system and may be similar to storage nodes 360 discussed above with regard to FIG. 3). Clients of a database may access a data access node 510 as indicated at request 502 and response 504, such as requests that are directed to client-managed tables) via network utilizing various database access protocols (e.g., Java Database Connectivity (JDBC) or Open Database Connectivity (ODBC)). However, storage nodes 560, which may be employed by the database service 210 to store rowblocks of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 560 may perform various storage, access, change logging, recovery, log record manipulation, and/or space management operations in a manner that is invisible to clients of a database access node 510.

As previously noted, a database access node 510 may implement query engine 520 and storage service engine 530, in some embodiments. Query engine 520 may receive requests, like request 512, which may include queries or other requests such as updates, deletions, etc., from database client 500 which first received the request 502 from the database client 500. Query engine 520 then parses them, optimizes them, and develops a plan to carry out the associated database operation(s).

Query engine 520 may return a response 504 to database client 500, which may include write acknowledgements, requested data (e.g., records or other results of a query), error messages, and or other responses, as appropriate. As illustrated in this example, database access node 510 may also include a storage service engine 530 (similar to storage service engines discussed above with regard to FIGS. 3 and 4) which may route read requests and/or redo log records to various storage nodes 560 within storage service 220, receive write acknowledgements from storage nodes 560, receive requested records or rowblocks from storage nodes 560, and/or return error messages, or other responses to query engine 520 (which may, in turn, return them to a database client).

In this example, query engine 520 or another database system management component implemented at data access node 510 (not illustrated) may manage a cache, in which records that were recently accessed may be temporarily held. Query engine 520 may be responsible for providing transactionality and consistency in the database of which data access node 510 is a component. However, as discussed above, some or all of the responsibility for transactionality and consistency may be instead provided by storage service engine 530 and/or storage nodes 560. For example, as discussed in detail above and below storage nodes 560 can help to ensure the Atomicity, Consistency, and Isolation properties of the database and the transactions that are directed that the database by using a snapshot time of the database applicable for a query to perform MVCC and provide specific records or rowblocks. Instead of using undo log records to generate prior versions of tuples of a database, storage nodes(s) 560 may have multiple versions of records available for providing the appropriate version of a record, and remove using garbage collection techniques discussed below, those records for transactions that do not commit, removing the burden of generating and applying undo records from query engine 520. In this way, processing times of transactions and other write requests can be significantly improved as separate undo log records do not have to be generated, sent, or applied by database access node 510.

A request 502 that includes a request to write to a table may be parsed and optimized to generate one or more write record requests 521, which may be sent to storage service engine 530 for subsequent routing to storage service nodes 560. In this example, storage service engine 530 may generate one or more redo log records 535 corresponding to each write record request 521, and may send them to specific ones of the storage nodes 560 of storage service 220. Storage nodes 560 may return a corresponding write acknowledgement 537 for each redo log record 535 (or batch of redo log records) to data access node 510 (specifically to storage service engine 530). Storage service engine 530 may pass these write acknowledgements to query engine 520 (as write responses 523), which may then send corresponding responses (e.g., write acknowledgements) to one or more clients as a response 514.

In another example, a request that is a query may cause rowblocks to be read and returned to query engine 520 for evaluation. For example, a query could cause one or more read record requests 525, which may be sent to storage service engine 530 for subsequent routing to storage nodes 560 as requests to obtain records or rowblocks. As discussed above with regard to FIGS. 1 and 4, these requests may specify a record identifier and time value so that the appropriate rowblocks may be identified and correct version of the record returned. In this example, storage service engine 530 may send these requests to specific ones of the storage nodes 560, and storage nodes 560 may return the requested records in their rowblocks 539 (or partial rowblocks or individual records) to database access node 510 (specifically to storage service engine 530). Storage service engine 530 may send the returned rowblocks/records to query engine 520 as return data records 527, and query engine 520 may then evaluate the content of the data pages in order to determine or generate a result of a query sent as a response 514.

In some embodiments, various error and/or data loss messages 541 may be sent from record-aware storage service storage nodes 560 to data access node 510 (specifically to storage service engine 530). As discussed below, this may include indications that, for example storage nodes 560 sent an error other indication 531 that a prepare statement conflicts with another prepare statement at storage nodes 560. These messages may be passed from storage service engine 530 to query engine 520 as error and/or loss reporting messages 529, and then to one or more clients as a response 514.

In some embodiments, the APIs 531-539 to access storage nodes 560 and the APIs 521-529 of storage service engine 530 may expose the functionality of record-aware storage service 220 to database access node 510 as if database access node 510 were a client of storage service 220. For example, data access node 510 (through storage service engine 530) may write redo log records or request records through these APIs to perform (or facilitate the performance of) various operations of the database system implemented by the combination of data access node 510 and storage nodes 560 (e.g., storage, access, change logging, recovery, and/or space management operations).

Note that in various embodiments, the API calls and responses between data access node 510 and storage nodes 560 (e.g., APIs 521-529) and/or the API calls and responses between storage service engine 530 and query engine 520 (e.g., APIs 535-539) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with data access node 510 and/or storage nodes 560.

Figure 6:
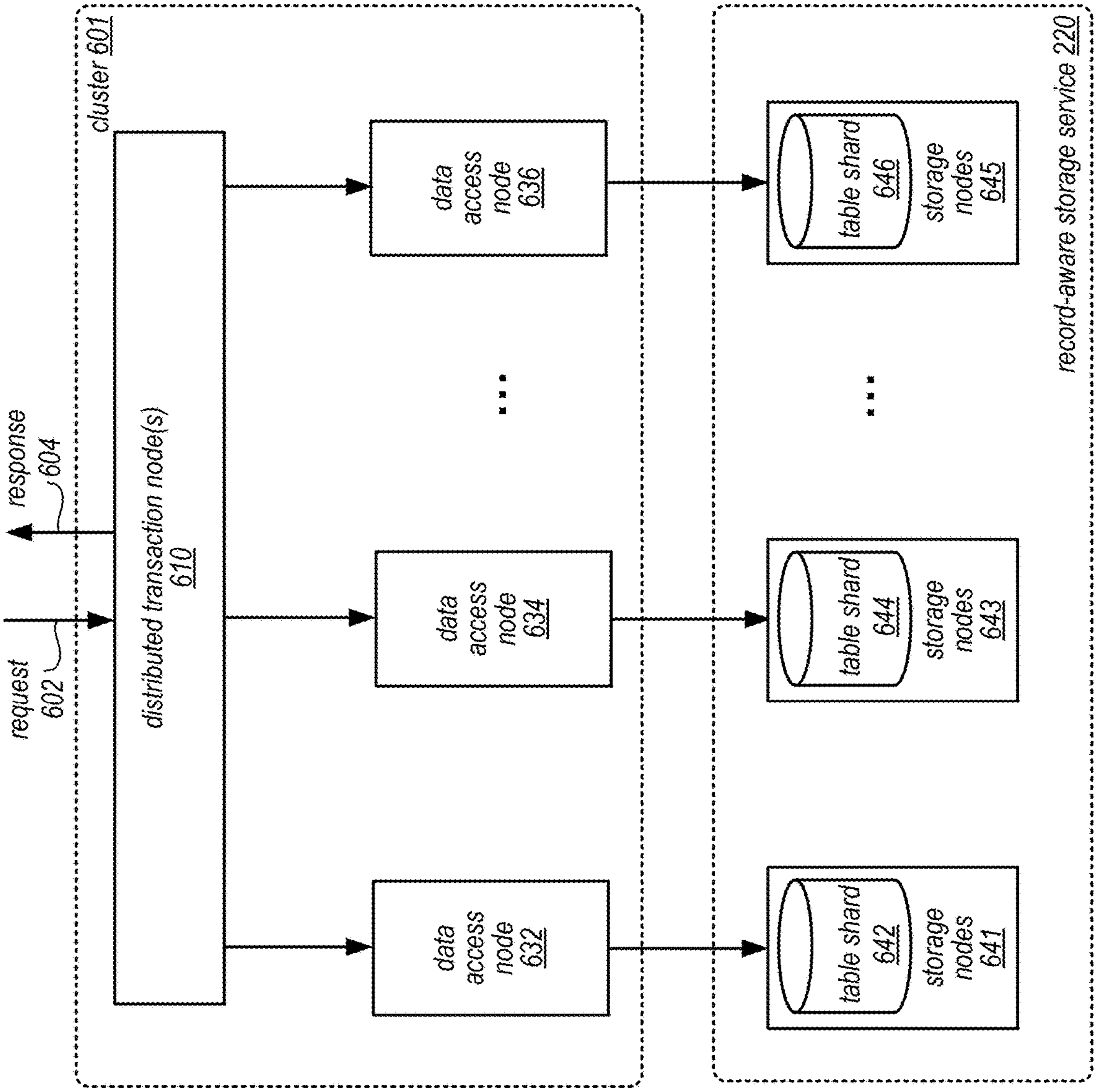
FIG. 6 is a logical block diagram illustrating a cluster of data access nodes that utilize a record-aware storage service, according to some embodiments.

FIG. 6 is a logical block diagram illustrating a cluster of data access nodes that utilize a record-aware storage service, according to some embodiments. Request 602 may be received at one of many distributed transaction nodes 610 that are implemented as part of cluster 601. In some embodiments, pool of distributed transaction nodes may be assigned to a particular database, such that the combination of distributed transaction nodes and data access nodes may be considered a cluster. For example, when a client opens a client connection, the DNS (or NLB) will re-direct the physical socket connection to one of the distributed transaction nodes. Since the distributed transaction nodes serve as the front end for all traffic, they may be implemented to be highly available. The distributed transaction nodes may be similar to (e.g., run same engine binaries) to data access nodes and may, in some embodiments, host database tables (not illustrated). Each distributed transaction node may be attached to one or more data stores to store metadata (and in some embodiments table data) and temporary tables or other temporary data that may need to be persisted locally. In some embodiments, a distributed transaction node may be designated a distributed transaction node leader (e.g., one of a group of distributed transaction nodes). The distributed transaction node leader will be the primary owner of system-managed table metadata. The distributed transaction node leader may also serve as the coordinator when necessary for operations that might require serialization. In some embodiments, distributed transaction nodes may be distributed across fault tolerance or other availability zones and may perform distributed transaction node failover (or distributed transaction node addition) in order to maintain high availability for a database to which the pool of distributed transaction nodes are assigned.

In some embodiments, distributed transaction nodes may implement respective connection managers (not illustrated). As distributed transaction nodes may mostly pull the data from data access nodes for shards of a system-managed table (though not always as illustrated in some of the example distributed transaction techniques discussed below), in some embodiments, there may be a DB connection pool from every distributed transaction node to every data access node (e.g., for a database). However, reusing connections from one query engine cannot usually be done between users. In such scenarios, the connection manager may be responsible for cleaning up a database connection (with a client application as depicted in FIG. 5) after database session is closed (e.g., performing operations to clear data such as session configuration, user/role info, etc.) and starting processes, instances, or other components (e.g., pgBouncer instances for Postgres databases) for cases when new data access nodes and distributed transaction nodes are added to a database with system-managed tables for a user as part of scale-out of data access nodes or distributed transaction nodes or recovery/replacement of existing data access nodes or distributed transaction nodes. When a new client application database connection to a distributed transaction node needs to contact other nodes (e.g., distributed transaction node or a data access node) it does so through foreign data wrapper (FDW) managed foreign server, which may be modified to contact a local connection manager for getting an available database connection at which moment the session context may be set based on an original database connection to a distributed transaction node. This may include session configuration (e.g., selective) and user/role info. With that, request routing may ensure that access to remote objects respects privileges and as data access nodes are computation nodes as well configuration is set (as it may not be common for FDW established connections which set just a user based on user mapping configured for a foreign server).

A distributed transaction node 610 may accept the request and direct it to the appropriate data access nodes using both query planning location selection techniques and, if a transaction, commit protocol techniques. For a sharded table, multiple shards may be determined or assigned to different data access nodes 632, 634, and 636 respectively for shards 642, 644, and 646 storage at storage nodes 641, 643, and 645. Although not illustrated, read-only nodes may also be assigned to shards in order to satisfy the workload requirements on system-managed tables. The number of assigned data access nodes and shards for a system-managed table may change over time as additional compute or storage capacity is needed. These changes may be determined automatically by a database service (e.g., via heat management). In at least one embodiment, as discussed in detail below with regard to FIG. 9, table shards may belong different respective silos, which may be attached to data access nodes.

Figure 7A:
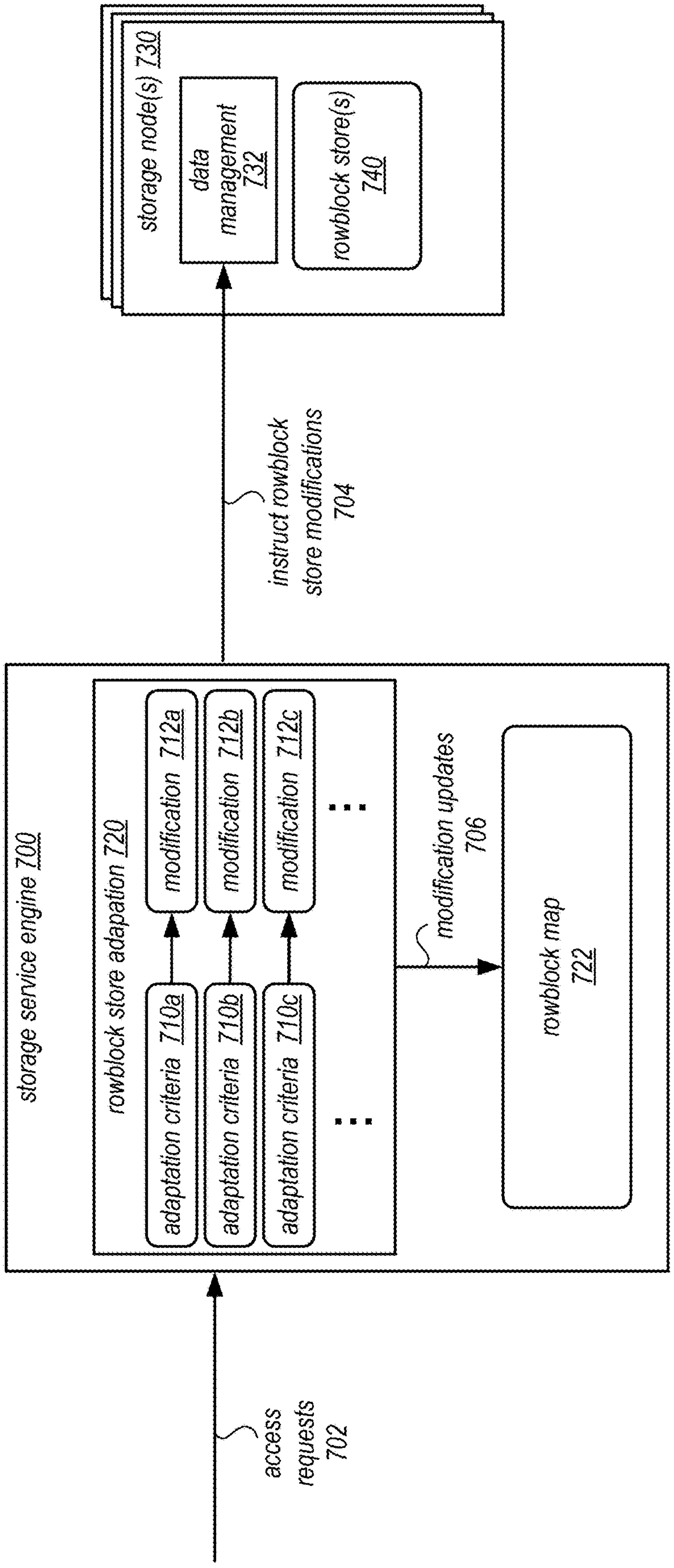
FIG. 7A is a logical block diagram illustrating interactions between storage service engine and storage nodes for row-block store adaptations, according to some embodiments.

FIG. 7A is a logical block diagram illustrating interactions between storage service engine and storage nodes for rowblock store adaptations, according to some embodiments. Storage service engine 700 (similar to storage service engines discussed above with regard to FIGS. 3-5), may implement rowblock store adaptation 720. Rowblock stopper adaptation 720 may support different back-end storage optimizations that can be performed independent of database systems that store their data in record-aware storage service 720. For example, different data movements, restructurings, reformatting, or movement between record-aware storage service 220 and backup storage service(s) 230 may be performed without instructions or providing visibility of the changes to database access nodes. Instead, storage service engine 700 can, as discussed above, provide requested data in a format expected by the database access nodes without regard to the format used by record-aware storage service 220.

Rowblock store adaptation 720 may track or be aware of different access requests 702 sent by a query engine, for example, to storage service engine 700. Storage service engine 700 may perform these requests, as discussed above. However, storage service engine 700 may also monitor or evaluate these access requests with respect to different adaptation criteria 710*a*, 710*b*, 710*c*, and so on to detect whether corresponding modifications 712*a*, 712*b*, 712*c*, and so on should be performed. For example adaptation criteria 710*a* may evaluate for time-based splits of rowblocks, while adaptation criteria 710*b* may evaluate for record identifier-based splits of rowblocks, and adaptation criteria 712*c* evaluate for movement between protection groups to balance workloads to different storage nodes within a silo, in some embodiments. Different examples are described below with respect to FIGS. 7B to 7D. Other example modifications may include merges of rowblocks (e.g., according to time or record identifier) or moving data from record aware storage service 220 to a backup storage service 230.

For detected or determined modifications, storage service engine 700 may send an instruction for a rowblock modification to corresponding storage node(s) 730 that store the rowblocks to be modified (e.g., as indicated in rowblock map 722). Data management 732 may perform the different modifications with respect to rowblock stores 740, as instructed. Updates to rowblock map 722 may also be made, as indicated at 706.

Figure 7B:
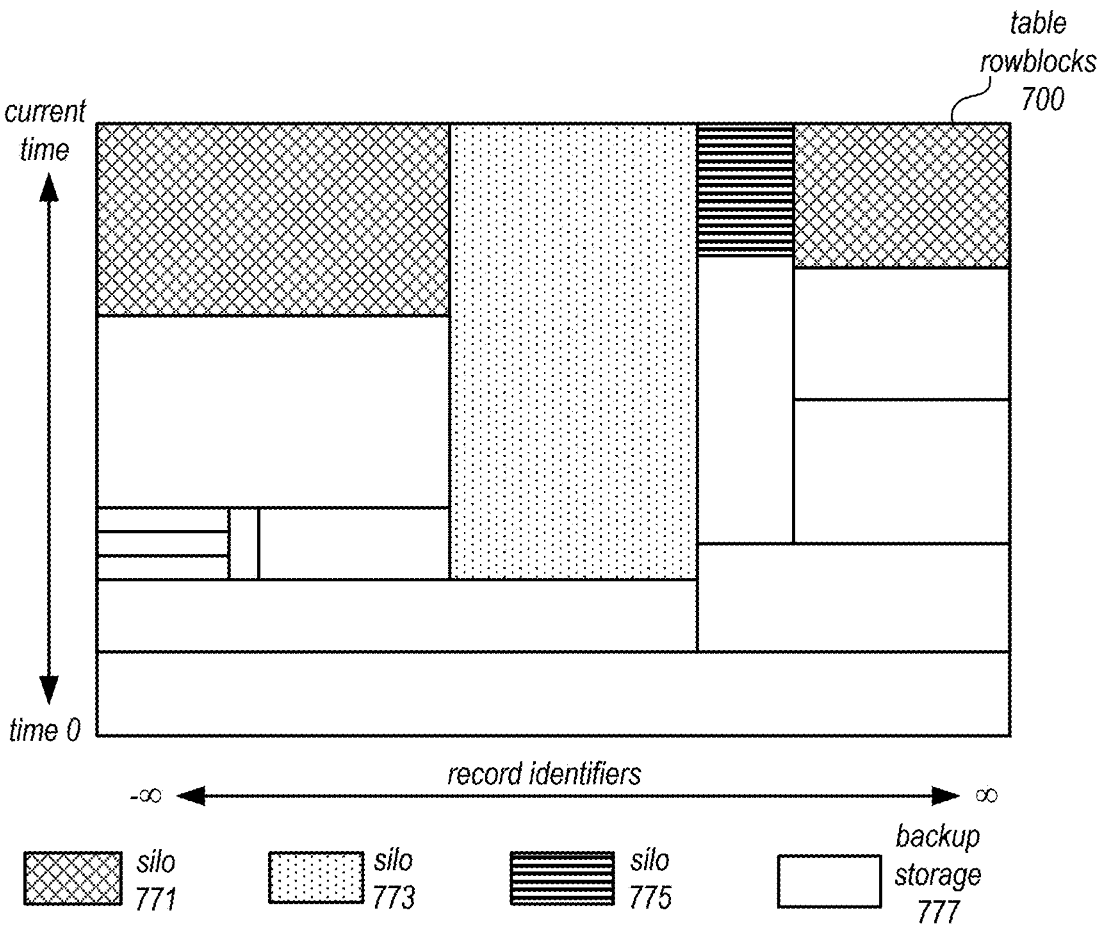
FIG. 7B illustrates an example distribution of the row-blocks of a table, according to some embodiments.

FIG. 7B illustrates an example distribution of the rowblocks of a table, according to some embodiments. A table's rowblocks 700 may be distributed between multiple silos, such as silos 771, 773, and 775, as well as backup storage 777. The distribution may change over time within silos and between silos and backup storage 777. For example, data in silo 771 illustrates greater ranges of time and record identifiers of rowblocks in backup storage 777 when compared with silo 773 or silo 775. Such different distributions may reflect the performance requirements or workloads of different storage nodes and/or usage patterns of the table itself (e.g., where infrequently accessed data or older data is moved to backup storage 777).

Figure 7C:
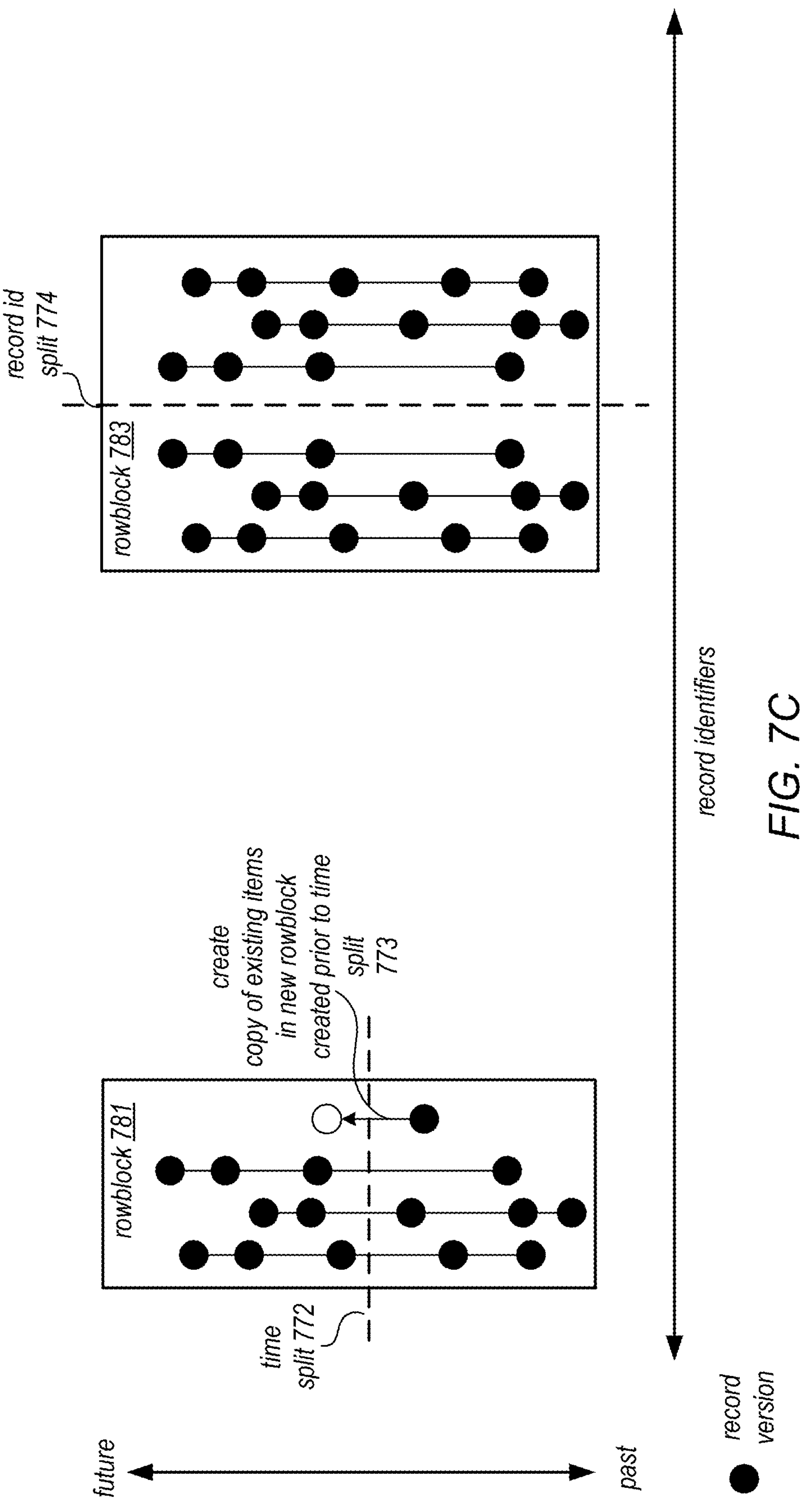
FIG. 7C illustrates example splits of a rowblock, according to some embodiments.

FIG. 7C illustrates example splits of a rowblock, according to some embodiments. Rowblock 781, for example, illustrates a rowblock that has been identified for a time split 772. A time split 772 may cause the creation of a new rowblock (not illustrated), where rowblock 781 is sealed from storing more records, and the new rowblock includes some of the existing records in the same record identifier range but with a different time range (e.g., from a time corresponding to time split 772 and onwards). In the case where a record was created or last updated prior to the time split, a copy may be created in the new rowblock that corresponds to the version in the other rowblock, so that the "current" version of a record as of the range of time of the new rowblock exists in the new rowblock, as indicated at 773. Times split may handle scenarios where the number of updates to records in a rowblock exceeds a threshold (e.g., as described in an adaptation criteria).

As indicated at 774, a record id split may be determined for rowblock 783. This split may split the range of record identifiers assigned to a rowblock. For example, two new rowblocks may be created and the original range of record identifiers for rowblock 784 may be divided between them. Rowblock 784 may be sealed from further records and the two new row blocks may take over. Record id split may handle scenarios where there number of records with different record identifiers in a rowblock exceeds a threshold (e.g., as described in an adaptation criteria).

Although splits have been discussed with respect to FIG. 7C, in some embodiments, rowblocks can be merged along time and/or record identifier boundaries. For example, records from one or more rowblocks may be written to a target rowblock for the merge (or to a new rowblock) and the source rowblocks reclaimed for storing other data.

Figure 7D:
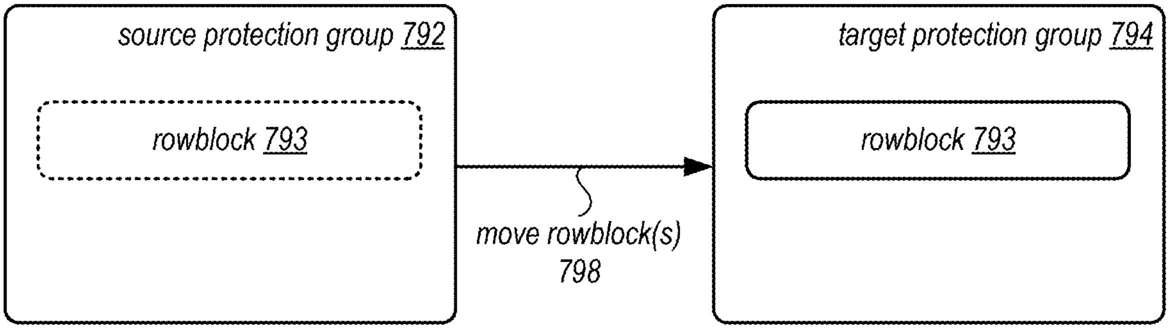
FIG. 7D illustrates data movement between protection groups for rowblock adaptation, according to some embodiments.

FIG. 7D illustrates data movement between protection groups for rowblock adaptation, according to some embodiments. Another example rowblock modification is the movement of a rowblock from one protection group to another. In this way, access workloads can be better distributed. For example, as discussed in detail below with regard to FIG. 9, a protection group may be a number of segments, that are respective copies of rowblocks. When one or more rowblocks is "hot" (e.g., receiving a large number of access requests), it may be that by moving the hot rowblocks to another protection group (e.g., removing the rowblocks from segments in one protection group and adding them to segments in a target protection group) can better distribute the workload to a less utilized set of storage nodes, improving overall performance of record-aware storage service 220. As illustrated in FIG. 7D, a rowblock modification moves 798 rowblock 793 from source protection group 792 to target protection group 794.

Another type of rowblock modification may be moving a rowblock from record-aware storage service 220 to backup storage service(s) 230. For example, a storage service engine may identify infrequently accessed data (or data with time values older than backup threshold) and instruct storage nodes to move corresponding rowblocks to backup storage service(s) 230.

Figure 8:
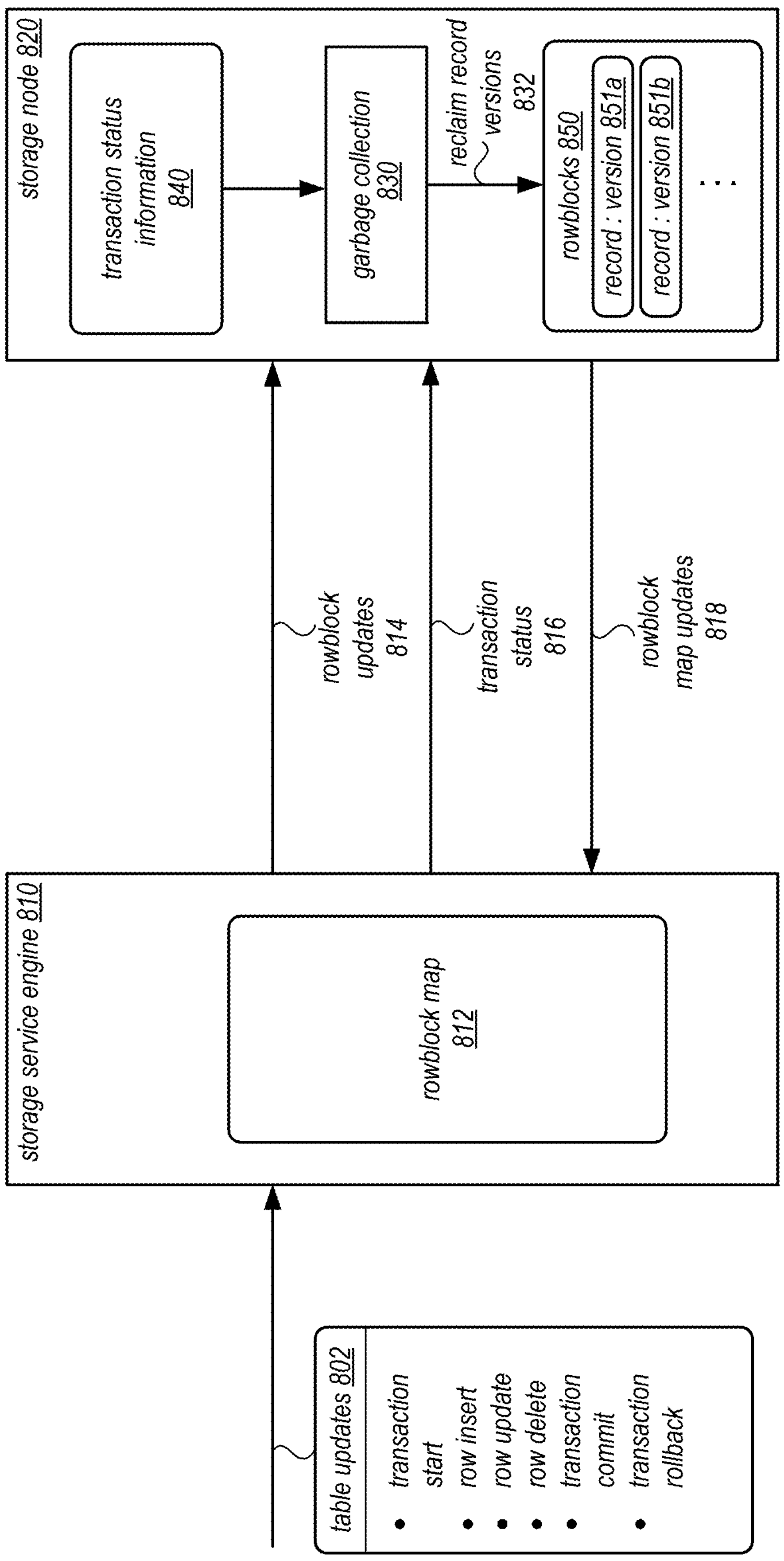
FIG. 8 is a logical block diagram illustrating interactions between a storage service engine and a storage node for performing garbage collection, according to some embodiments.

FIG. 8 is a logical block diagram illustrating interactions between a storage service engine and a storage node for performing garbage collection, according to some embodiments. As discussed in detail above, storage service engines, such as storage service engine 810, may receive requests to interact with a table from a database management node (e.g., a database access node). For example, table updates 802 may include one or more instructions to start a transaction, insert a row, update a row, delete a row, commit a transaction, and/or rollback a transaction. Storage service engine 810 may be able to determine which storage nodes to instruct based on a rowblock map 812. As discussed above, rowblocks may store one or more records according to a record range and time range. As indicated at 814, storage service engine 810 may instruct different rowblock updates 814 as well as transaction status 816 (e.g., to commit a transaction, rollback/abort a transaction, or start a transaction).

Storage node 820 may implement garbage collection 830 in order to detect garbage collection events and perform garbage collection. Transaction status 816 may be used to update transaction status information 840. Rowblock updates 814 may be used to update rowblocks 850, storing, for example, (record: version), such as record versions 851*a*, 851*b*, and so on. As discussed in detail below with regard to FIG. 12, garbage collection 830 may detect various types of garbage collection events and perform garbage collection as a background process to avoid interference with rowblock updates 814. Garbage collection 830 may identify versions of records to reclaim, and then reclaim them, as indicated at 832. Because storage node 820 implements garbage collection 830, garbage collection can proceed without coordination by the database system (e.g., by database access nodes). Instead of waiting to receive information indicating how much and which records can be reclaimed, garbage collection 830 can proceed in the background, at optimal times to avoid interface with request processing operations of storage node 820. Garbage collection events, for example, may be detected or acted upon when storage node 820 has workload or other utilization for foreground operations (e.g., request processing) below a threshold.

Figure 9:
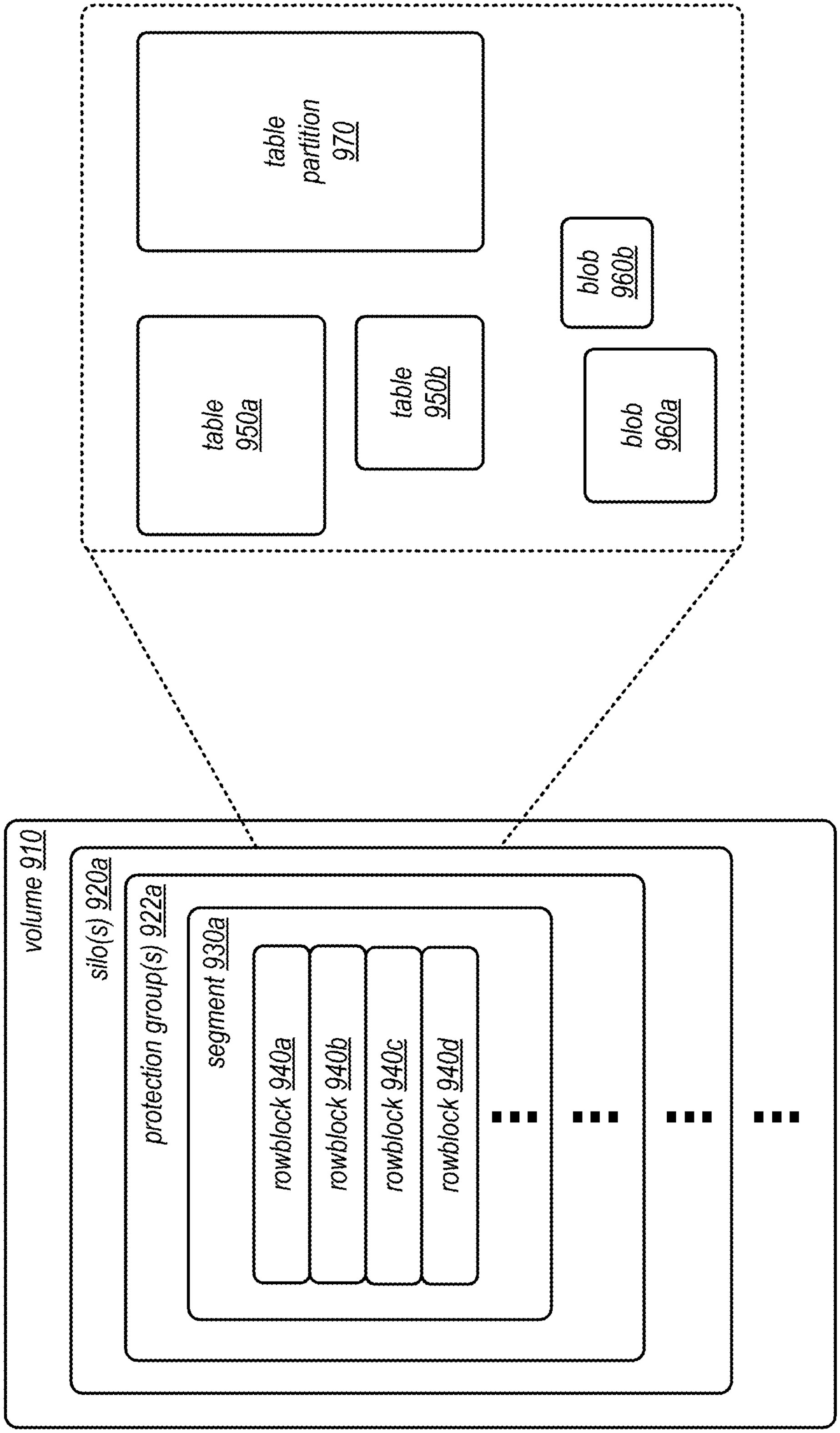
FIG. 9 is a logical block diagram illustrating a data arrangement of database in record-aware storage, according to some embodiments.

FIG. 9 is a logical block diagram illustrating a data arrangement of database in record-aware storage, according to some embodiments. A database may be stored, in some embodiments, as a logical volume, such as logical volume 910 (which may include both table data and corresponding log(s) or journals (e.g., redo logs) as well as other metadata or information for a table, such as transaction information and statistics collected about tables). Each logical volume may be organized as one or more silos 920 that stores different record identifier ranges and times, as discussed above. In some embodiments, a silo may represent a portion of volume 910 that can be attached or detached with respect to database access nodes, allowing an attached database access node to access records stored within a silo. Each silo 920 may be stored across a collection of storage nodes and may be further divided into one or more segments 930*a*. Each segment of a silo 920*a*, which may live on a particular one of the storage nodes. For example, in different embodiments, one, two, or three copies of the data or redo logs may be stored in each of one, two, or three different availability zones or regions, according to a default configuration, an application-specific durability preference, or a client-specified durability preference. Together a set of copies of a segment may be treated as a protection group. Thus for each different segment of a silo 920*a*, there may be a different corresponding protection group 922*a*.

In some embodiments, a volume may be a logical concept representing a highly durable unit of storage that a user/client/application of the storage system understands. A volume may be a distributed store that appears to the user/client/application as a data of a database, in some embodiments. Each write operation may be encoded in a log record (e.g., a redo log record), which may represent a logical, ordered mutation to the contents of database within the volume, in some embodiments. Each log record may be persisted to one or more synchronous segments in the distributed store that form a Protection Group (PG) 920*a*, to provide high durability and availability for the log record, in some embodiments.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments.

In some embodiments, a rowblock 940*a*, 940*b*, 940*c*, and 940*d*, may be a block of storage. In some embodiments, a block of storage (e.g., of virtual memory, disk, or other physical memory) of a size defined by the operating system, and may also be referred to herein by the term "data block". A rowblock may be a set of contiguous sectors, in some embodiments. A rowblock may serve as the unit of allocation in storage devices.

In some embodiments, storage nodes of record-aware storage service may perform some database system responsibilities, such as recovery and garbage collection, as discussed in detail below.

In some embodiments, a silo 920 may represent a recovery unit, to which recovery techniques are applied. A silo 920 may store different portions of one or more tables, such as, but not limited to one or more table partitions, such as table partition 970 (e.g., a shard as discussed above with regard to FIG. 6), one or more entire tables, such as tables 950*a* and 950*b*, and/or one or more data blobs, such as data blobs 960*a* and 960*b*. Data blobs may be different sized data objects that are referenced by identifiers or location information in a record stored in a table (e.g., in a rowblock) which are stored together. Although not illustrated, as discussed above, silo-specific journals or logs, which may be a log corresponding to each segment may also be stored as part of a silo 920.

Figure 10:
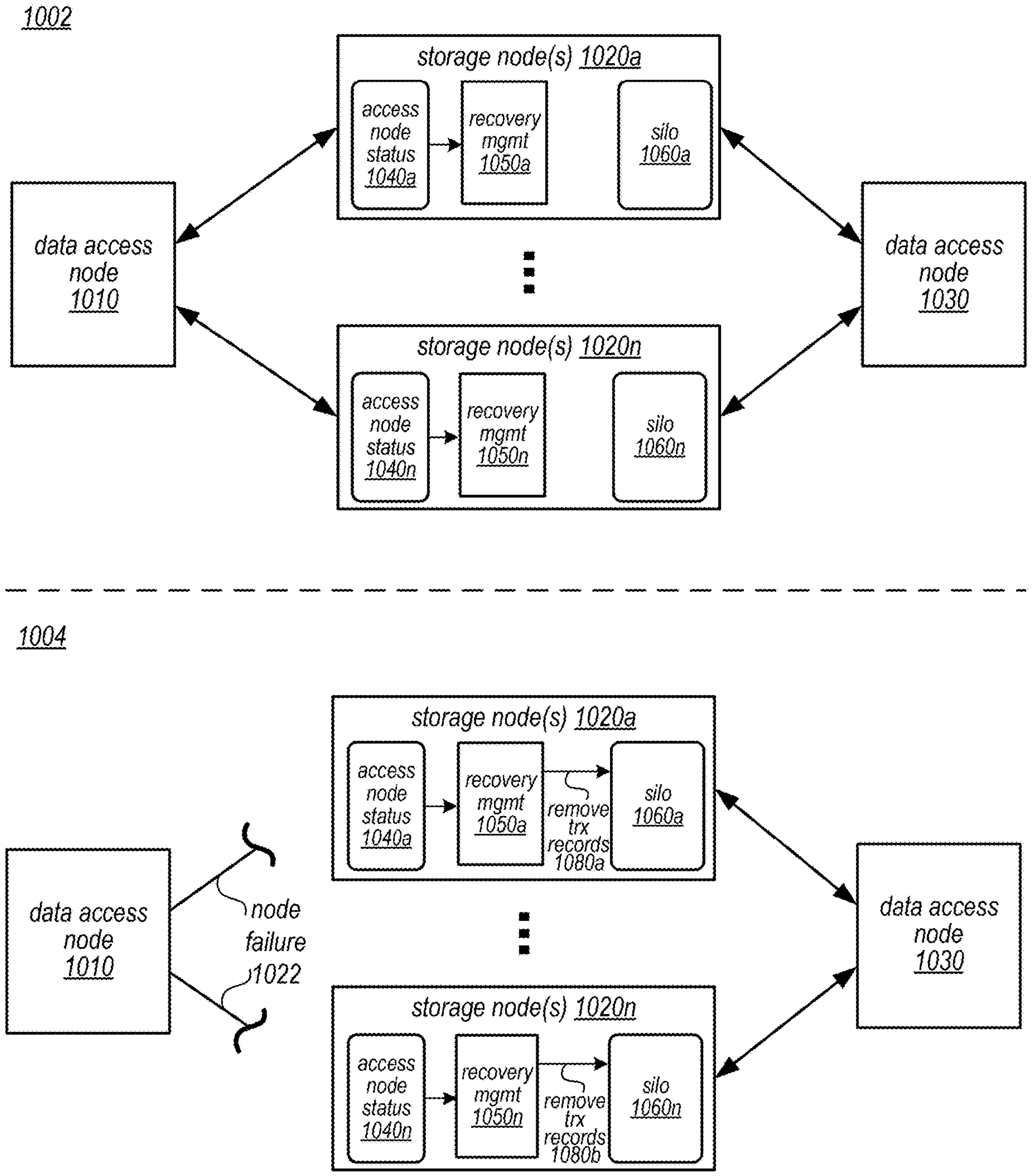
FIG. 10 is a logical block diagram illustrating storage node recovery upon data access node failure, according to some embodiments.

In at least some embodiments, a silo may represent a recovery unit, which may allow for recovery to be performed in independently within a recovery unit. For example, each segment can recover from a data access node failure that had inflight or in progress transactions as it maintains its own journal and transaction information. FIG. 10 is a logical block diagram illustrating storage node recovery upon data access node failure, according to some embodiments.

As illustrated in scene 1002, different data access nodes, 1010, and 1030, may access a set of storage nodes 1020*a* through 1010*n* (e.g., storing a silo or portion thereof, such as PG). Storage nodes 1020 may maintain access node status 1040*a* and 1040*n*, which can be monitored to detect access node failures. For example, as illustrated in scene 1004, data access node 1010 may fail. Failure may be detected because access node status 1040*a* is periodically updated using heartbeat or other connection status communications exchanged between storage nodes 1020 and data access nodes 1010 and 1030. In various embodiments, recovery management, such as recovery management 1050*a* and 1050*n*, may be implemented at respective storage nodes as part of data management 365 discussed above with regard to FIG. 3 (or similar features).

For example, as indicated in scene 1004, data access node 1010 experiences node failure 1022 (e.g., network failure, such as network partition, or application failure, such as failure of data access node 1010). Because storage nodes 1020*a* and 1020*n* may detect the failure, recovery management 1050*a* and 1050*n* can proactively perform clean up and remove 1080*a* and 1080*b*, versions of records associated with aborted/failed transactions to be rolled back, as discussed below with regard to FIG. 15, in order to recover from the failure of data access node 1010. In this way, data access nodes, such as data access node 1030 or data access node 1010 can avoid costly and time consuming techniques to generate and apply undo log records to recover from failures. Recovery can be performed as a background processing, similar to garbage collection as discussed above with regard to FIG. 8.

Moreover, in scenarios where multiple data access nodes are attached to a silo, such as data access node 1030 also being attached to silo 1060*a*, remaining data access nodes can still maintain access to storage nodes 1020*a* and 1020*n* during recovery (although individual transactions may fail if conflicting with affected versions of records by data access node 1010 failure 1022). This significantly reduces the impact of failures on multi-writer and/or writer and readers that commonly access the databases, shortening or eliminating downtime/recovery time for non-affected data access nodes.

Figure 11A:
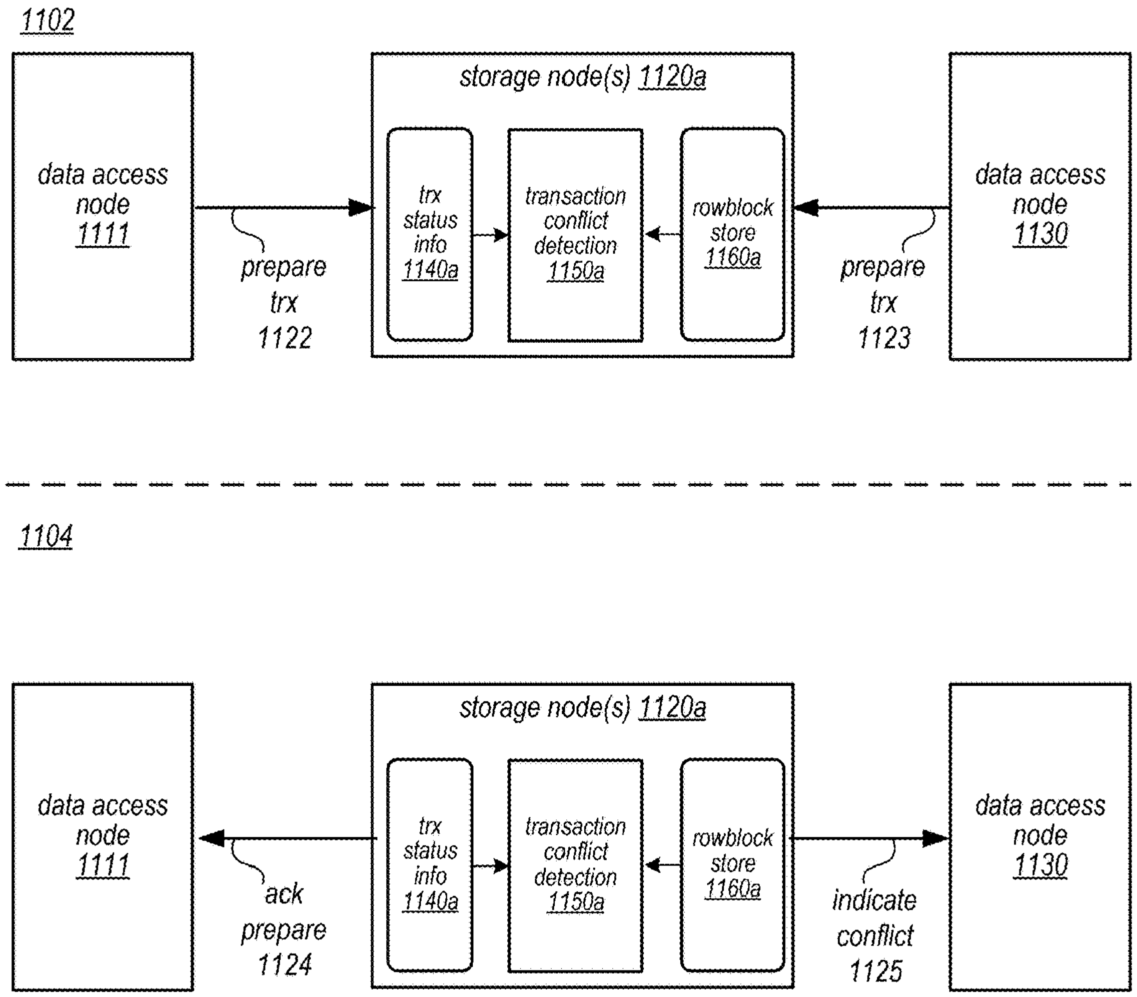
FIGS. 11A and 11B illustrate transaction conflict detection implemented at storage nodes of a record-aware storage service, according to some embodiments.
Figure 11B:
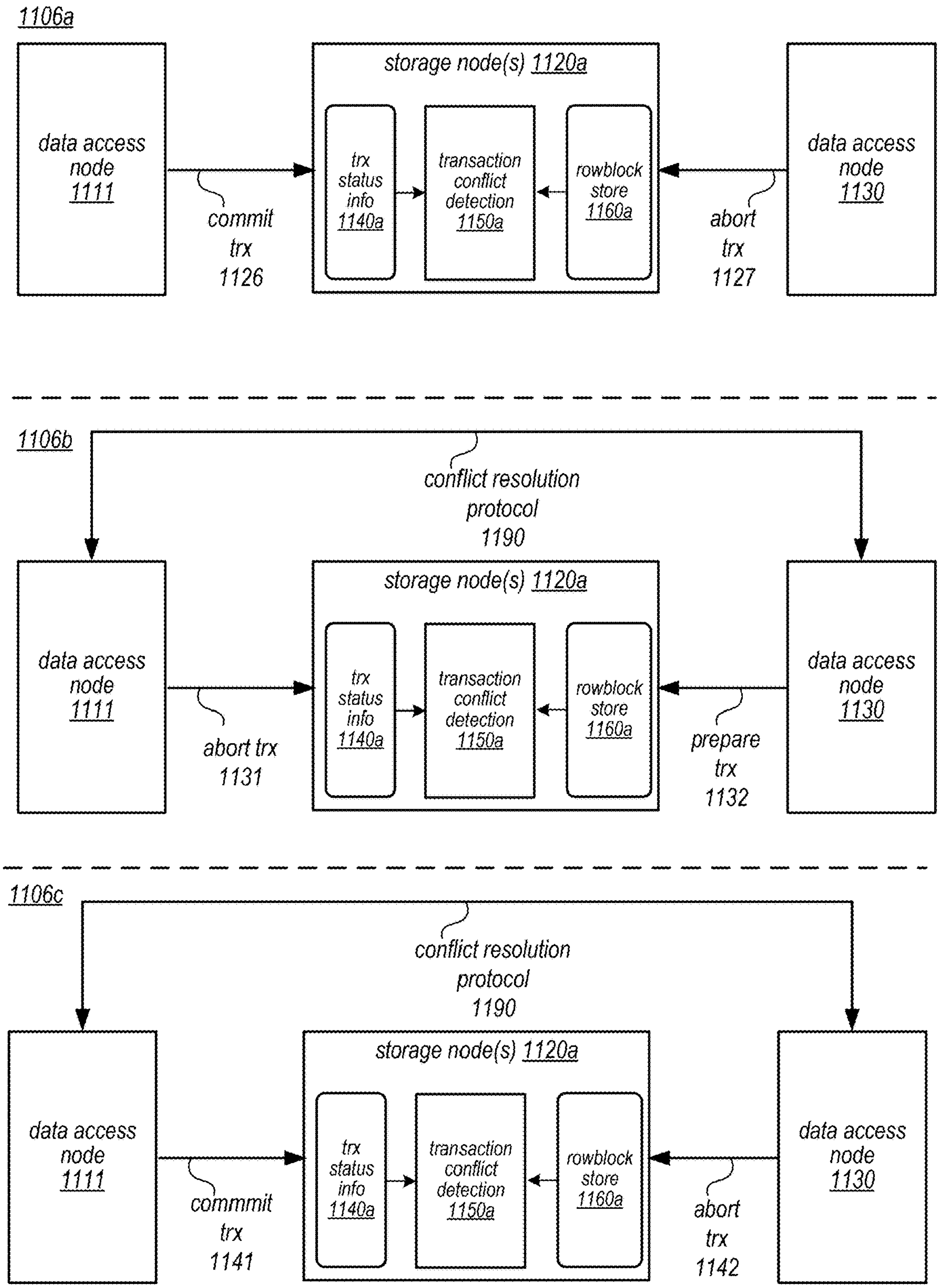

As discussed above, because rowblocks provide an understanding of the content of records stored within a rowblock (e.g., according to a record identifier range and time value), a record-aware storage service may implement transaction conflict detection on a per-record basis (e.g., as opposed to a page or other container basis that is not aware of whether individual record versions are committed). In this way, storage nodes can significantly improve the performance of transactions in multi-writer scenarios, as the number of transaction conflicts can be reduced to actual conflicts (e.g., conflicts with respect to the same record), instead of detecting a conflict when two writers are writing to the same unit of allocation (e.g., writing to the same rowblock but different rows). FIGS. 11A and 11B illustrate transaction conflict detection implemented at storage nodes of a record-aware storage service, according to some embodiments.

As illustrated in scene 1102 in FIG. 11A, two data access nodes, 1111 and 1130, attempt to prepare a transaction, as indicated at 1122 and 1123, by sending prepare requests to storage node(s) 1120*a*. A prepare request may be type of request implemented as part of a transaction protocol that begins the operations to commit a transaction that has been performed by a database access node with respect to a database stored in record-aware storage service. Many different transaction protocols may be implement in order to ensure that consensus is reached among participants in the transaction (e.g., storage node(s) 1120*a*). A two-phase commit protocol (2PC), for example, uses a prepare request to have each participant provisional perform (e.g., apply or store) a transaction (e.g., update(s) made to records or table(s) as part of a transaction). When each participant has acknowledged the prepare as successfully performed, the coordinator of the transaction (e.g., data access node 1111 or data access node 1130) may send a request to commit the transaction, making the transaction's updates visible in the database (e.g., according to MVCC rules). In the illustrated example, both data access nodes 1111 and 1130 may attempt to prepare a transaction involving at least one of the same records.

As illustrated in scene 1104, storage node(s) may be able determine that a conflict has occurred. For example, transaction status info 1140*a* may be updated when each data access node starts a transaction (which may be at different times). When updates are received as part of the transaction, the appropriate rowblock in rowblock store may be updated with respective new versions of the updated records by each transaction). However, these record versions may be provisional and not be made visible to other readers of the record unless successfully committed to the database. Therefore, when each data access node attempts to prepare their respective transactions, transaction conflict detection 1150*a* at a storage node 1120*a* can be performed. For example, transaction conflict detection 1150*a* may be able to determine that data access node 1111's prepare request successfully completed and was acknowledged at 1124. Therefore, if prepare transaction request 1123 is received later than prepare request 1122, storage node(s) 1120*a* can check transaction status information 1140*a* to see that the same record was affected by a successfully prepared transaction, and respond with a conflict indication, as indicated at 1125. In some embodiments, conflict indication 1125 may provide a transaction identifier for the other transaction, information for the other data access node 1111, or other information that can allow data access node 1130 to determine next steps for proceeding with its transaction.

For example, as illustrated in scene 1106*a*, data access node 1111 may proceed to send a request to commit the transaction to storage node(s) 1120*a*, which can apply the transaction, update transaction status information 1140*a* to reflect the transaction as committed and make the associated versions of the records visible in rowblock store 1160*a*. Data access node 1130 may then send a request to abort the transaction 1127, which allows storage node(s) 1120*a* to update transactions status information 1140*a* and ultimately perform garbage collection, as discussed above. The above example may be useful in scenarios where only a single protection group is being written (e.g., where if data access node succeeds at storage node 1120*a*, then the transaction will succeed). However, in some embodiments, some database access nodes may support transactions across protection groups or silos (e.g., as depicted in FIG. 6) and thus other techniques for resolving transaction conflicts may be implemented in addition to detection at storage nodes.

For example, a conflict resolution protocol 1190 implemented at data access nodes 111 and 1130 may be implemented. The transaction resolution protocol may be applied, for example deterministically so that each data access node can determine whether or how to proceed with a transaction. For example, data access node 1111 may also be performing prepare statements to other storage nodes (e.g., at another protection group storing different data in the same silo or be waiting for successful conformation of a transaction performed by other data access nodes in a cluster (as illustrated in FIG. 6)). If other portions of the transaction fail (e.g., to prepare), then data access node 1111 may ultimately decide to abort transaction, as indicated at 1131. Likewise data access node can, using conflict resolution protocol 1190 decide to wait for a period of time and try again to see if data access node 1111 ultimately succeeded and committed, as illustrated at 1141 in scene 1106*c*, or as illustrated in scene 1106*b*, aborted 1131. Data access node 1130 may try again to prepare, as indicated at 1132, which may succeed or fail depending upon data access node 1111 sending abort 1131 or commit 1141.

The database service and record-aware storage service discussed in FIGS. 2 through 11B provide examples of a database system that may implement record-aware distributed data storage. However, various other types of database systems may make use of record-aware distributed data storage. The following flowcharts illustrate various techniques that may be implemented for or using a record-aware data storage system which may be similar to or different than the architectures or descriptions above with regard to FIGS. 2 through 11B. For example, features implemented as part of a storage service engine may be implemented on a storage node, and vice-versa. Moreover, in some embodiments, a storage service engine may not be implemented at all or may be a light-weight implementation that merely provides access to storage nodes, relying upon storage nodes for MVCC, transaction conflict detection, rowblock management, and various other technique discussed above. Thus, the following techniques may be implemented using similar or different arrangements of components than those previously discussed.

Figure 12:
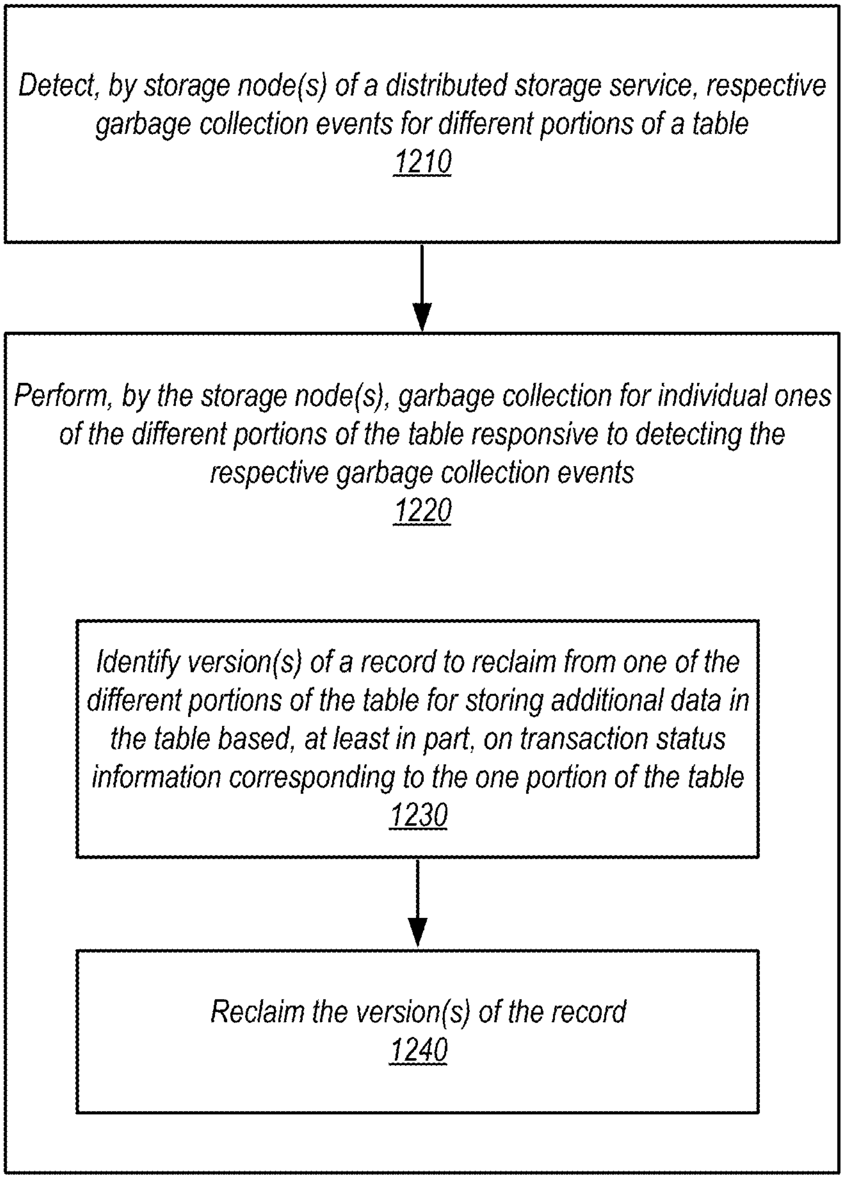
FIG. 12 is a high-level flowchart illustrating various methods and techniques to implement scalable garbage collection for separate distributed storage systems for database management applications, according to some embodiments.

FIG. 12 is a high-level flowchart illustrating various methods and techniques to implement scalable garbage collection for separate distributed storage systems for database management applications, according to some embodiments. As indicated at 1210, respective garbage collection events may be detected for different portions of a table, in some embodiments. For example, a table may be stored in a distributed storage service, such as record-aware storage service 220 discussed above, and may be stored in different portions (e.g., partitions, shards, or as discussed in detail above segments and silos). The table may be stored on behalf of a database management application (e.g. a database access node or data access node) that provides access to the table for client applications (e.g., that send queries or other types of access requests to the database management application). As discussed above with regard to FIG. 1, many different types of database management applications for different types of databases may be implemented (e.g., relational databases, non-relational databases, graph databases, dataframe data stores, key-value data stores, among others).

Garbage collection events may, in various embodiments, be detected independently. For example, a garbage collection event for one portion may be detected earlier or later than a garbage collection event for another portion (although simultaneous or overlapping garbage collection events could be detected in some scenarios). Garbage collection events may be detected according to information specific to a particular portion (e.g., number of deleted records or number or rolled-back or failed transactions exceeds a threshold). In some embodiments, garbage collection events may be triggered by (though not delay performance of) access requests, such as read requests for records or write requests for records.

As indicated at 1220, garbage collection may be performed for individual ones of the different portions of the table responsive to detecting the respective garbage collection events at different storage node(s), in some embodiments. For example, storage nodes may initiate background processes to perform garbage collection. In some embodiments, garbage collection may start or be performed during periods of low foreground processing workloads (e.g., low numbers access requests for reading or writing to records in a table).

As part of garbage collection, one or more version(s) of a record to reclaim may be identified from one of the different portions of the table for storing additional data in the table based, at least in part, on transaction status information corresponding to the one portion of the table, in some embodiments, as indicated at 1230. For example, the status information may indicate which transactions are in progress, committed, or failed/aborted/rolled-back. Then, record versions associated with failed/aborted/rolled-back transactions can be identified for reclamation. In some embodiments, when a request to delete a record is received, the version of the record to delete may be marked for deletion and later reclaimed (sometime referred to as vacuuming). The record versions marked for deletion may be identified for reclamation.

As indicated at 1240, the identified version(s) of the record may be reclaimed, in some embodiments. For example, the versions may be marked as free or otherwise made available to be overwritten. In some embodiments, reclamation may include reformatting, deleting, scrubbing, or otherwise changing a corresponding storage (e.g., a byte range on a storage device). This technique may be performed for any version(s) of record(s) that do not need to be retained.

Figure 13:
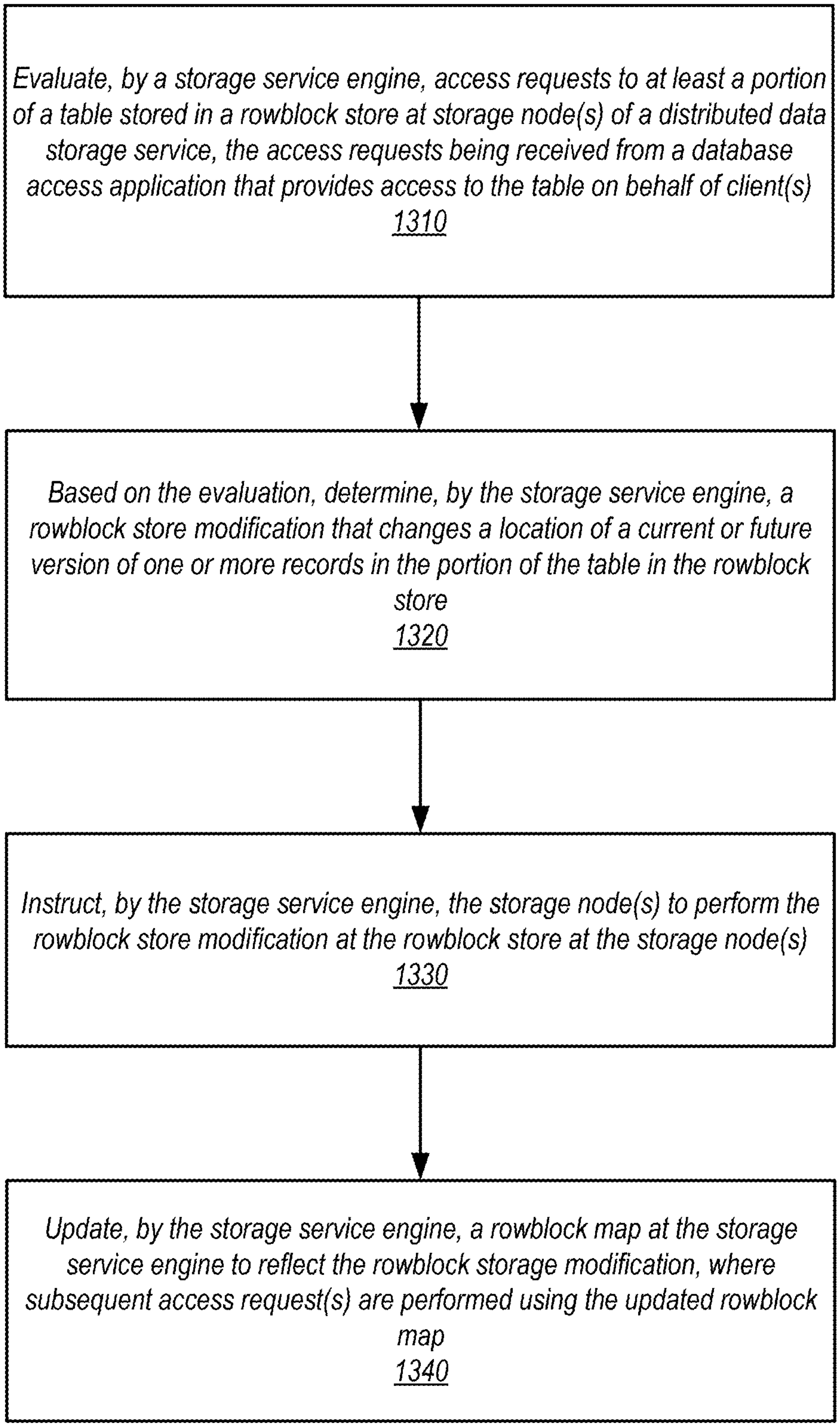
FIG. 13 is a high-level flowchart illustrating various methods and techniques to implement rowblock modifications for record-aware distributed storage systems for database management applications, according to some embodiments.

FIG. 13 is a high-level flowchart illustrating various methods and techniques to implement rowblock modifications for record-aware distributed storage systems for database management applications, according to some embodiments. As indicated at 1310, a storage service engine may evaluate access requests to at least a portion of a table stored in a rowblock store at storage node(s) of a distributed data storage service, in some embodiments. For example, various different adaptation criteria (as discussed above with regard to FIG. 7A) may be considered that detect scenarios when, for example, to many updates are received within a period of time, too many records with different identifiers are stored within a single rowblock, when rowblocks should be shifted between storage nodes for load balancing, or when rowblocks should be moved to different storage systems, such as backup storage systems, in some embodiments. These techniques, as well as other workload balancing, hot-record detection and amelioration, can be performed to improve distributed storage system performs.

As indicated at 1320, based on the evaluation, the storage service engine may determine a rowblock store modification that changes a location of a current or future version of one or more records in the portion of the table in the rowblock store, in some embodiments. For example, a time split, record identifier split, or movement of a row-block (which may also happen in conjunction with a time split) may be determined, changing where current and or future records are stored at a new rowblock with a different time value range and/or record identifier range.

As indicated at 1330, the storage service engine may instruct one or more storage nodes to perform the rowblock store modification at the rowblock store at the storage node(s), in some embodiments. The storage nodes may independently perform the different copies, allocations, or other operations to effect the instructed rowstore modifications.

As indicated at 1340, the storage service engine may update a rowblock map at the storage service engine to reflect the rowblock storage modification, where subsequent access requests are performed using the updated rowblock map, in some embodiments. In some embodiments, rowblock map may be updated over time (e.g., when changed portions of an index, changed by row store modifications are paged into the rowblock map's cache). In some embodiments, the updates may occur in conjunction with the rowblock changes made as part of the rowstore modifications.

Figure 14:
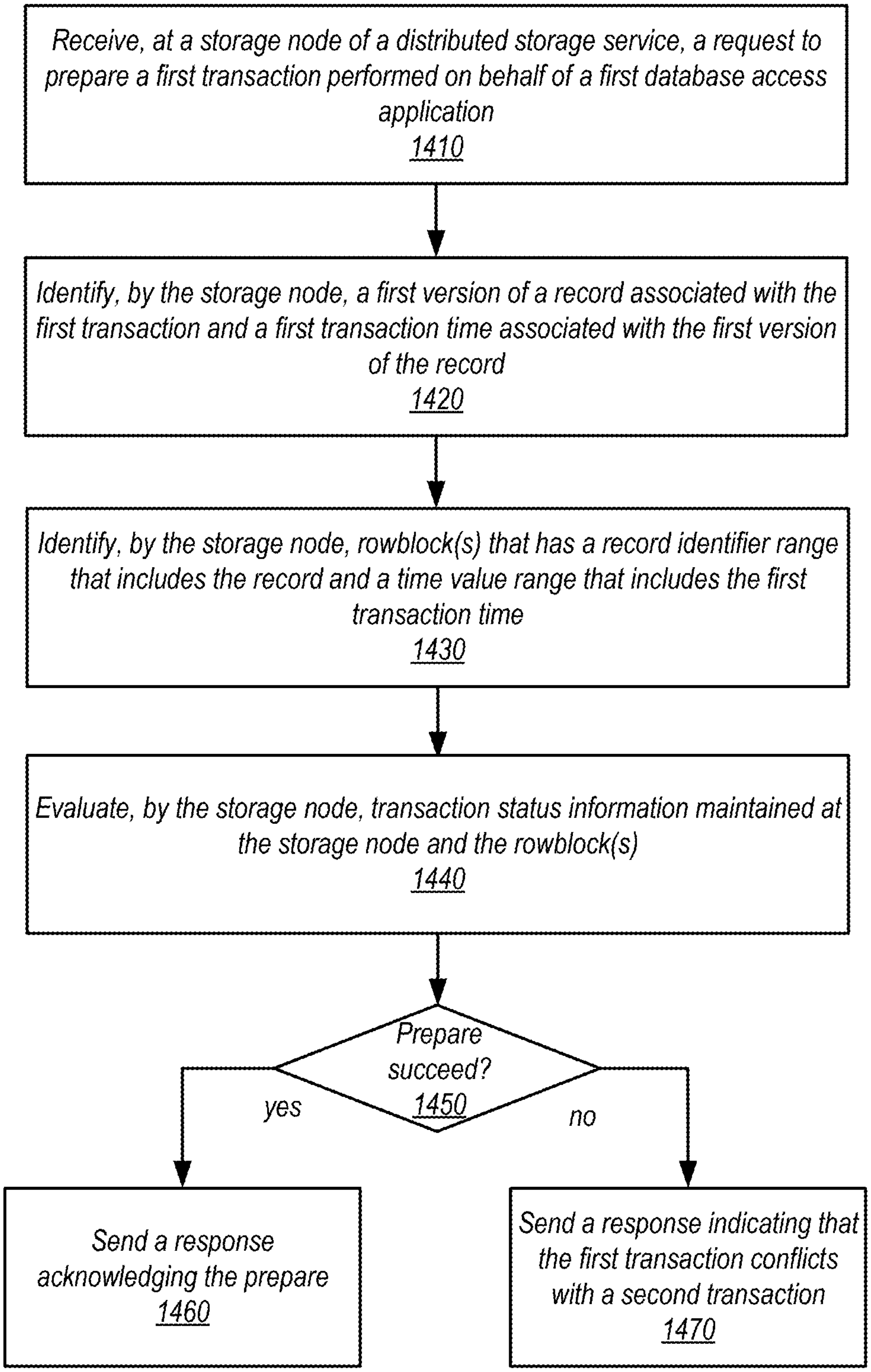
FIG. 14 is a high-level flowchart illustrating various methods and techniques to implement detect record-level conflicts at storage nodes of a record-aware distributed storage system for database management applications, according to some embodiments.

FIG. 14 is a high-level flowchart illustrating various methods and techniques to implement detect record-level conflicts at storage nodes of a record-aware distributed storage system for database management applications, according to some embodiments. As indicated at 1410, a storage node of a distributed storage service, may receive a request to prepare a first transaction performed on behalf of a first database access application, in some embodiments. The request may be made after having received one or more previous requests as part of the same, first transaction, that updated one or more records. When these updates were performed, new versions of the records may be stored (e.g., according to the copy-on-write techniques discussed above with regard to FIG. 1), but without indicating that these new versions should be made visible (e.g., a timestamp for the new versions may have an extract bit or other parameter that indicates the versions of the records are not visible).

As indicated at 1420, the storage node may identify a first version of the record associated with the first transaction and a first transaction time associated with the first version of the record, in some embodiments. For example, transaction status information, as discussed above with regard to FIGS. 10, 11A, and 11B, may be updated to reflect started, in progress, prepared, and/or committed transactions, an include information indicating their associated records, in some embodiments. The first transaction time may be a time associated with the receipt of the prepare statement, receipt of a start request or other request to begin a transaction, or a time value associated with the performance of the update to create the first version of the record. As indicated at 1430, the storage node may identify one or more rowblocks that have record identifier ranges that include a record identifier of the record and a time value range that includes the first transaction time. For example, an index, such as a time-split b-tree may be used to identify the corresponding rowblock(s).

As indicated at 1440, an evaluation of the transaction status information maintained at the storage node and the rowblock(s) themselves may be performed to determine whether the prepare statement conflicts with another transaction acting upon the same record. For example, the first version of the record may have another version of the record, a second version that is not yet visible but has already prepared. In this case, the prepare may not succeed, as indicted by the negative exit from 1450. The storage node may send, as indicated at 1470, a response indicating the first transaction conflicts with the second transaction. If, however, no other non-visible version of the record has prepared (or no non-visible version of the record exists), then a positive exit from 1450, indicating that the prepare succeeds and a response acknowledging success of the prepare may be sent, as indicated at 1460.

As discussed above with regard to FIG. 11B, success or failure of a single prepare may not end the analysis at the database access applications if other portions of the transaction have to successfully prepare for other portions of the table (or other tables) in a database. Thus it may be that the first transaction may ultimately succeed, or not, depending the subsequent conflict resolution protocols applied by the different database access applications that are interacting with the storage node.

Figure 15:
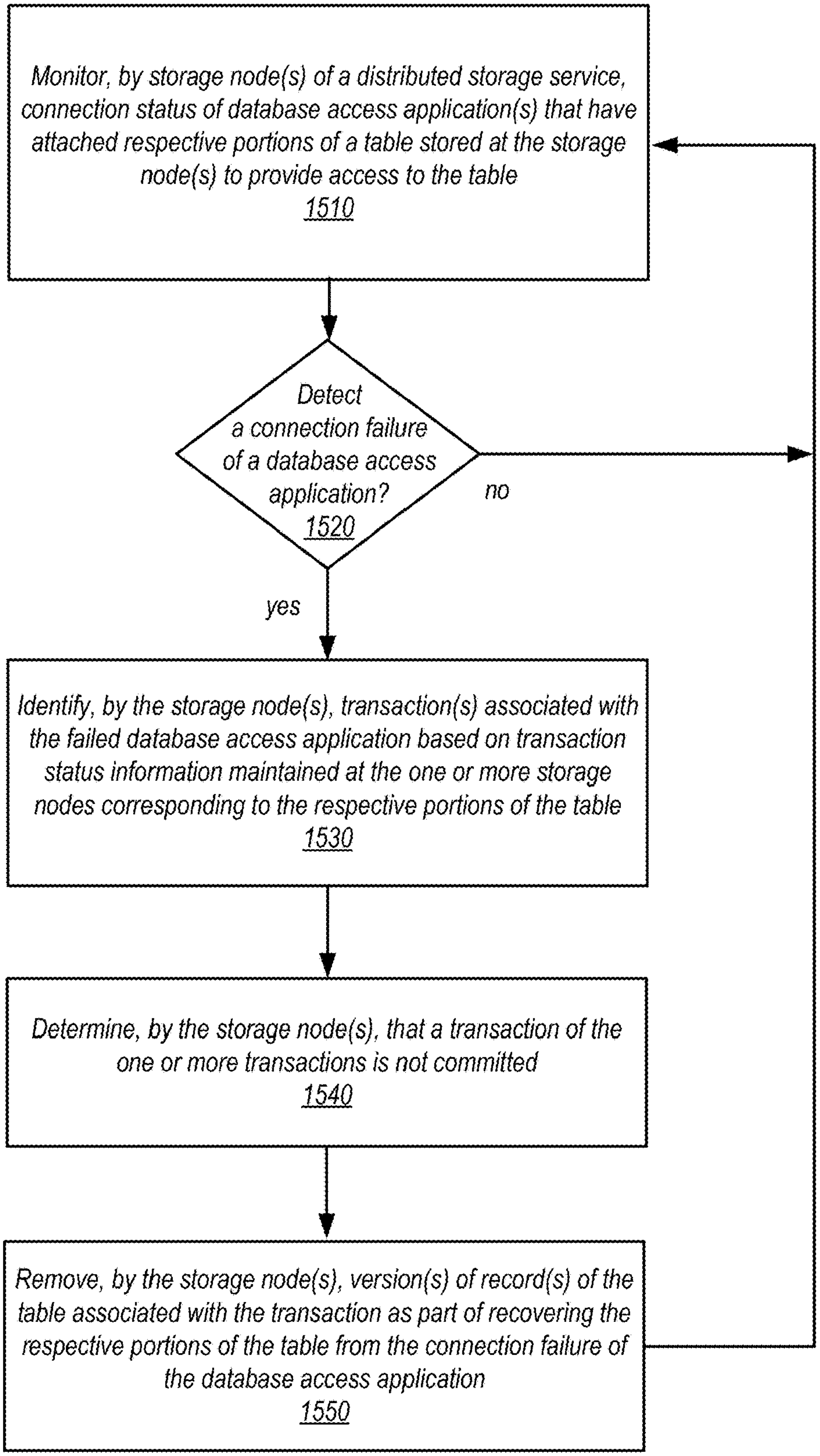
FIG. 15 is a high-level flowchart illustrating various methods and techniques to implement scalable recovery for portions of a table upon database access application failure, according to some embodiments.

FIG. 15 is a high-level flowchart illustrating various methods and techniques to implement scalable recovery for portions of a table upon database access application failure, according to some embodiments. As indicated at 1510, storage node(s) may monitor a connection status of database access application(s) that have attached respective portions of a table stored at the storage node(s) to provide access to the table. For example, as discussed above with regard to FIG. 10, storage nodes may maintain connection information for different connected database access applications, using heartbeats or other information to determine whether a connection has continued.

As indicated at 1520, a connection failure of a database access application may be detected, in some embodiments. If so, then as indicated at 1530, transaction(s) associated with the failed database access application may be identified based on transaction status information maintained at the one or more storage nodes corresponding to the respective portions of the table. As indicated at 1540, a transaction may be determined to be not committed. As indicated at 1550, version(s) of record(s) associated with the transaction may be removed by the storage node(s) as part of recovering the respective portions of the table from the connection failure of the database access application, in some embodiments. As noted above, in some embodiments, transaction status information can be used to determine which transactions have committed or not. In some embodiments, data access nodes may have to send further instructions (e.g., when a transaction prepared but did not prepare at other protection groups, then a database access application may have to subsequently request the transaction that prepared be aborted, causing associated record versions to be reclaimed.

Figure 16:
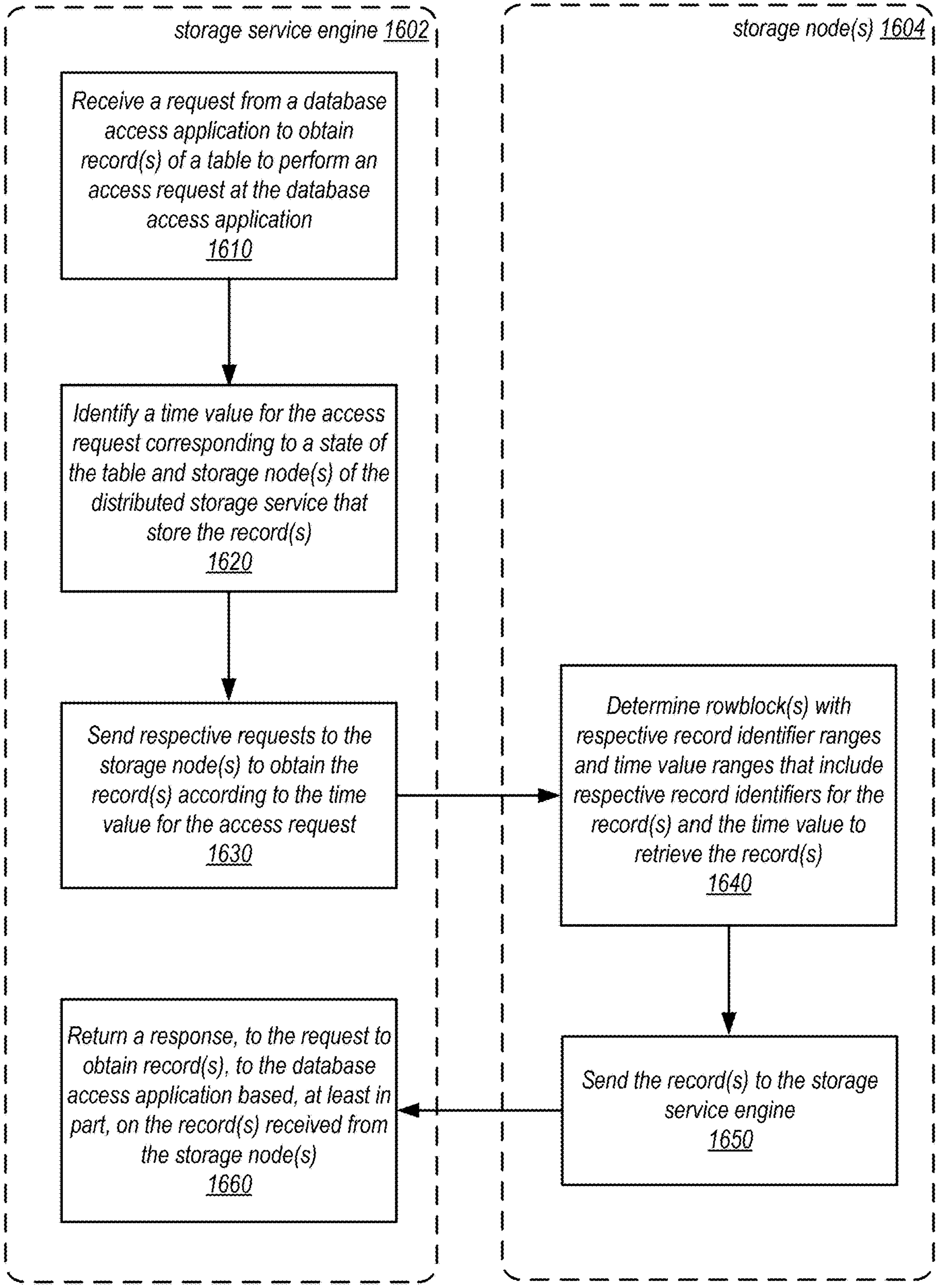
FIG. 16 is a high-level flowchart illustrating various methods and techniques to implement performing record requests at a record-aware distributed storage system for database management applications, according to some embodiments.

FIG. 16 is a high-level flowchart illustrating various methods and techniques to implement performing record requests at a record-aware distributed storage system for database management applications, according to some embodiments. As indicated at 1610, storage service engine 1602 may receive a request from a database access application to obtain one or more record(s) to perform an access request at the database access application, in some embodiments. In some embodiments, the access request may be a read request (e.g., a query or a request to get or obtain a record). In some embodiments, the request may be a write request, such as request to insert, update, or delete a record. In some embodiments, the access request may be performed as part of a transaction (e.g., a read or write request included in a transaction statement).

As indicated at 1620, a time value for the access request corresponding to a state of the table and storage node(s) of the distributed data storage service that store the record(s) may be identified, in some embodiments. For example, a time synchronization service may be used to assign a timestamp to the access request at the database access application. The same time synchronization service may be used by the distributed data storage system to ensure clock synchronization for comparing timestamps.

As indicated at 1630, respective requests may be sent to the one or more storage nodes to obtain the record(s) according to the time value for the access request may be sent, in some embodiments. The storage nodes may be identified using a rowblock map, as discussed above, which may include an index, such as time-split b-tree that indexes both time values and record identifiers to rowblocks that are the leaf nodes of the index. As indicated at 1640, storage nodes 1604 may determine one or more rowblocks with respective record identifier ranges and time value ranges that include respective record identifiers for the one or more records and the time value to retrieve the record(s), in some embodiments. For example, rowblock metadata may describe the contents of rowblocks in order to verify at the storage nodes which rowblocks should be accessed for the records. In some embodiments, the storage nodes may filter according to the time sent.

As indicated at 1650, storage nodes 1604 may send the record(s) to the storage service engine 1602. In at least some embodiments, the records may be sent as part of entire rowblocks. In some embodiments, partial rowblocks or one or more individual records may be sent. In some embodiments, the storage nodes may perform time-based filtering of records to exclude those records that are associated with the time value of the transaction.

As indicated at 1660, the storage service engine 1602, may return a response to the database access application based, at least in part, on the record(s) received from the storage node(s) 1604, in some embodiments. In some embodiments, the storage service engine may ensure that sufficient number of requests are received that satisfy a quorum requirement. In some embodiments, the storage service engine may apply MVCC to select one version of a record that should be visible according to the time value associated with the transaction and use that one version of the record to generate result for the access request.

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 17:
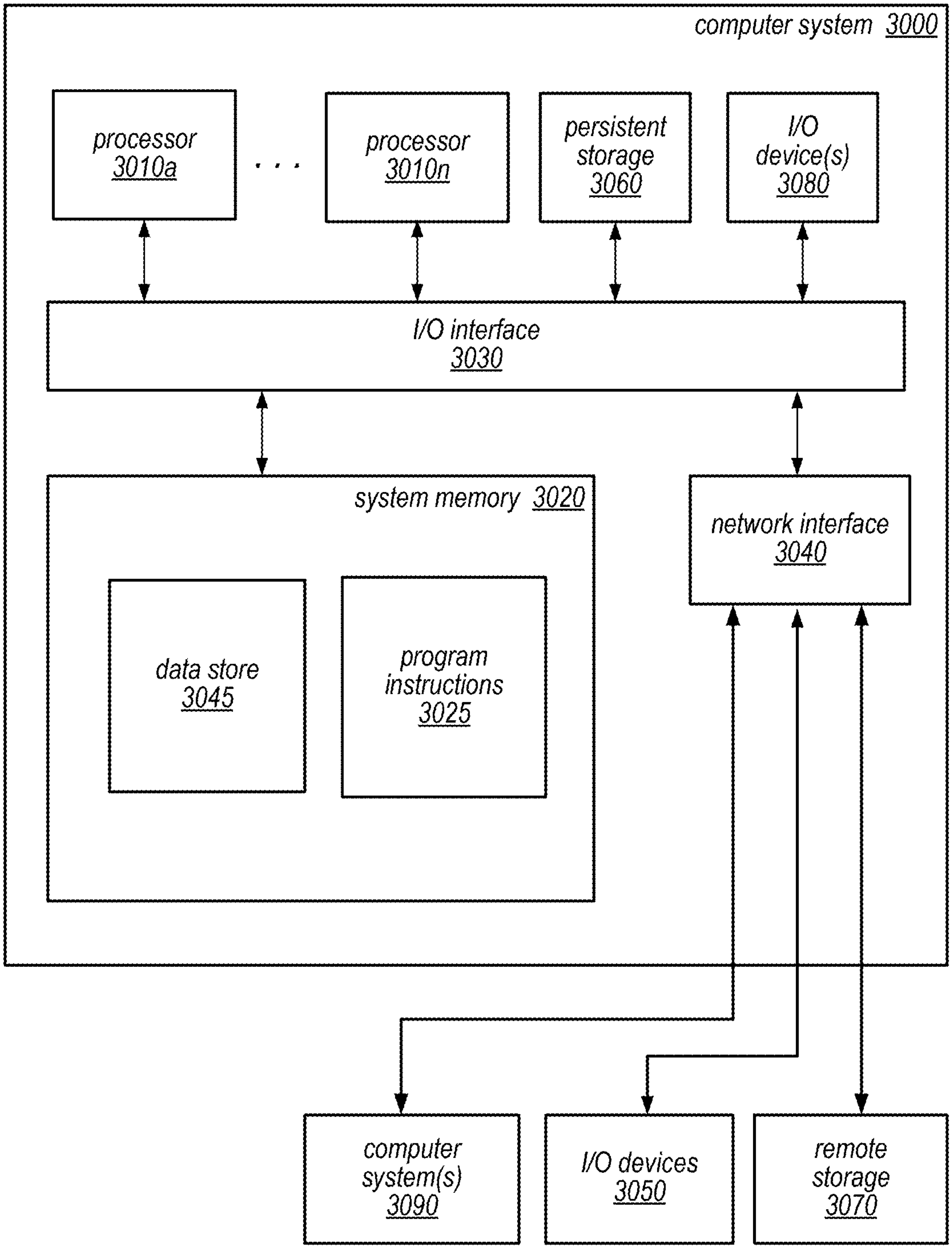
FIG. 17 is a block diagram illustrating an example computer system, according to various embodiments.

FIG. 17 is a block diagram illustrating an example computer system that may implement the various techniques of commit time logging for time-based multi-version concurrency control discussed above with regard to FIGS. 1-11, according to various embodiments described herein. For example, computer system 3000 may implement a data processing node, distributed transaction node, and/or a storage node of a separate storage system that stores database tables and associated metadata on behalf of clients of the database tier, in various embodiments. Computer system 3000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 3000 includes one or more processors 3010 (any of which may include multiple cores, which may be single or multi-threaded) coupled to a system memory 3020 via an input/output (I/O) interface 3030. Computer system 3000 further includes a network interface 3040 coupled to I/O interface 3030. In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. The computer system 3000 also includes one or more network communication devices (e.g., network interface 3040) for communicating with other systems and/or components over a communications network (e.g. Internet, LAN, etc.). For example, a client application executing on system 3000 may use network interface 3040 to communicate with a server application executing on a single server or on a cluster of servers that implement one or more of the components of the database systems described herein. In another example, an instance of a server application executing on computer system 3000 may use network interface 3040 to communicate with other instances of the server application (or another server application) that may be implemented on other computer systems (e.g., computer systems 3090).

In the illustrated embodiment, computer system 3000 also includes one or more persistent storage devices 3060 and/or one or more I/O devices 3080. In various embodiments, persistent storage devices 3060 may correspond to disk drives, tape drives, solid state memory, other mass storage devices, or any other persistent storage device. Computer system 3000 (or a distributed application or operating system operating thereon) may store instructions and/or data in persistent storage devices 3060, as desired, and may retrieve the stored instruction and/or data as needed. For example, in some embodiments, computer system 3000 may host a storage system server node, and persistent storage 3060 may include the SSDs attached to that server node.

Computer system 3000 includes one or more system memories 3020 that may store instructions and data accessible by processor(s) 3010. In various embodiments, system memories 3020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 3020 may contain program instructions 3025 that are executable by processor(s) 3010 to implement the methods and techniques described herein (e.g., various features of fine-grained virtualization resource provisioning for in-place database scaling). In various embodiments, program instructions 3025 may be encoded in native binary, any interpreted language such as Java™ byte-code, or in any other language such as C/C++, Java™, etc., or in any combination thereof. In some embodiments, program instructions 3025 may implement multiple separate clients, server nodes, and/or other components.

In some embodiments, program instructions 3025 may include instructions executable to implement an operating system (not shown), which may be any of various operating systems, such as UNIX, LINUX, Solaris™, MacOS™, Windows™, etc. Any or all of program instructions 3025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 3000 as system memory 3020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 3040.

In some embodiments, system memory 3020 may include data store 3045, which may be configured as described herein. For example, the information described herein as being stored by the database tier (e.g., on a primary node), such as a transaction log, an undo log, cached page data, or other information used in performing the functions of the database tiers described herein may be stored in data store 3045 or in another portion of system memory 3020 on one or more nodes, in persistent storage 3060, and/or on one or more remote storage devices 3070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 3045 or in another portion of system memory 3020 on one or more nodes, in persistent storage 3060, and/or on one or more remote storage devices 3070, at different times and in various embodiments. Similarly, the information described herein as being stored by the storage tier (e.g., redo log records, data pages, data records, and/or other information used in performing the functions of the distributed storage systems described herein) may be stored in data store 3045 or in another portion of system memory 3020 on one or more nodes, in persistent storage 3060, and/or on one or more remote storage devices 3070, at different times and in various embodiments. In general, system memory 3020 (e.g., data store 3045 within system memory 3020), persistent storage 3060, and/or remote storage 3070 may store data blocks, replicas of data blocks, metadata associated with data blocks and/or their state, database configuration information, and/or any other information usable in implementing the methods and techniques described herein.

In one embodiment, I/O interface 3030 may coordinate I/O traffic between processor 3010, system memory 3020 and any peripheral devices in the system, including through network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments, some or all of the functionality of I/O interface 3030, such as an interface to system memory 3020, may be incorporated directly into processor 3010.

Network interface 3040 may allow data to be exchanged between computer system 3000 and other devices attached to a network, such as other computer systems 3090 (which may implement one or more storage system server nodes, query processing nodes, such as data access nodes and distributed query processing nodes of a cluster, and/or clients of the database systems described herein), for example. In addition, network interface 3040 may allow communication between computer system 3000 and various I/O devices 3050 and/or remote storage 3070. Input/output devices 3050 may, in some embodiments, include one or more display terminals, keyboards, keypads, touchpads, scanning devices, voice or optical recognition devices, or any other devices suitable for entering or retrieving data by one or more computer systems 3000. Multiple input/output devices 3050 may be present in computer system 3000 or may be distributed on various nodes of a distributed system that includes computer system 3000. In some embodiments, similar input/output devices may be separate from computer system 3000 and may interact with one or more nodes of a distributed system that includes computer system 3000 through a wired or wireless connection, such as over network interface 3040. Network interface 3040 may commonly support one or more wireless networking protocols (e.g., Wi-Fi/IEEE 802.11, or another wireless networking standard). However, in various embodiments, network interface 3040 may support communication via any suitable wired or wireless general data networks, such as other types of Ethernet networks, for example. Additionally, network interface 3040 may support communication via telecommunications/telephony networks such as analog voice networks or digital fiber communications networks, via storage area networks such as Fibre Channel SANs, or via any other suitable type of network and/or protocol. In various embodiments, computer system 3000 may include more, fewer, or different components than those illustrated in FIG. 17 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
- a first plurality of nodes, respectively comprising at least one processor and a memory, that implement a database service that provides access to databases on behalf of clients of the database service;
- a second plurality of nodes, respectively comprising at least one further processor and a further memory, that implement a distributed storage service that stores tables of the databases on behalf of the database service;
- wherein the database service comprises one or more data access nodes that have attached respective portions of a table stored at the one or more storage nodes of the distributed storage service to provide access to a table;
- wherein the one or more storage nodes are configured to:
  - monitor connection status information of the one or more database access nodes updated according to heartbeat communications exchanged with the one or more storage nodes;
  - based on the monitoring, detect a connection failure of one of the one or more data access nodes;
  - recover the respective portions of the table at the one or more storage nodes, wherein to perform the recovery, the one or more storage nodes are configured to:
    - evaluate transaction status information maintained at the one or more storage nodes, separate from the connection status information, corresponding to the respective portions of the table to identify one or more transactions associated with the one data access node;
    - determine that a transaction of the one or more transactions is not committed; and
    - remove one or more versions of one or more records of the table associated with the transaction.

2. The system of claim 1, wherein the determination that the transaction of the one or more transactions is not committed based, at least in part, on determination of consensus between at least two of the two or more storage nodes that the transaction is not committed.

3. The system of claim 1, wherein the one or more storage nodes are further configured to:
- determine that another transaction of the one or more transactions is committed; and
- update a further one or more versions of a further one or more records of the table associated with the other transaction to indicate the further one or more versions of the further one or more records are committed as part of recovering the respective portions of the table from the connection failure of the one database access application.

4. The system of claim 1, wherein a different one of the one or more data access nodes that have attached respective portions of the table stored at the one or more storage nodes performs one or more access requests during the recovering of the respective portions of the table from the connection failure of the one database access application.

5. A method, comprising:
- monitoring, by one or more storage nodes of a distributed storage service, connection status information of one or more database access applications that have attached respective portions of a table stored at the one or more storage nodes to provide access to the table, wherein the connection status information is updated according to heartbeat communications exchanged between the one or more database access applications and the one or more storage nodes;
- based on the monitoring, detecting, by the one or more storage nodes, a connection failure of one of the one or more database access applications;
- identifying, by the one or more storage nodes, one or more transactions associated with the one database access application based, at least in part, on transaction status information maintained at the one or more storage nodes, separate from the connection status information, corresponding to the respective portions of the table;
- determining, by the one or more storage nodes, that a transaction of the one or more transactions is not committed; and
- removing, by the one or more storage nodes, one or more versions of one or more records of the table associated with the transaction as part of recovering the respective portions of the table from the connection failure of the one database access application.

6. The method of claim 5, wherein determining that the transaction of the one or more transactions is not committed based, at least in part, on determination of consensus between at least two of the two or more storage nodes that the transaction is not committed.

7. The method of claim 5, wherein the respective portions of the table are stored as part of a silo.

8. The method of claim 7, wherein the respective portions of the table are partitions of the table and wherein the silo further includes an entire table.

9. The method of claim 7, wherein the respective portions of the table are partitions of the table and wherein the silo further includes one or more data blobs.

10. The method of claim 5, wherein the one or more versions of one or more records of the table are removed from one or more rowblocks.

11. The method of claim 5, further comprising:

determining, by the one or more storage nodes, that another transaction of the one or more transactions is committed; and updating, by the one or more storage nodes, a further one or more versions of a further one or more records of the table associated with the other transaction to indicate the further one or more versions of the further one or more records are committed as part of recovering the respective portions of the table from the connection failure of the one database access application.

12. The method of claim 5, wherein a different one of the one or more database access applications that have attached respective portions of the table stored at the one or more storage nodes performs one or more access requests during the recovering of the respective portions of the table from the connection failure of the one database access application.

13. One or more non-transitory, computer-readable storage media, storing program instructions that when executed on or across one or more computing devices cause the one or more computing devices to implement:

monitoring, by one or more storage nodes of a distributed storage service, connection status information of one or more database access applications that have attached respective portions of a table stored at the one or more storage nodes to provide access to the table, wherein the connection status information is updated according to heartbeat communications exchanged between the one or more database access applications and the one or more storage nodes;

based on the monitoring, detecting, by the one or more storage nodes, a connection failure of one of the one or more database access applications;

identifying, by the one or more storage nodes, one or more transactions associated with the one database access application based, at least in part, on transaction status information maintained at the one or more storage nodes, separate from the connection status information, corresponding to the respective portions of the table;

determining, by the one or more storage nodes, that a transaction of the one or more transactions is not committed; and removing, by the one or more storage nodes, one or more versions of one or more records of the table associated with the transaction as part of recovering the respective portions of the table from the connection failure of the one database access application.

14. The one or more non-transitory, computer-readable storage media of claim 13, wherein determining that the transaction of the one or more transactions is not committed based, at least in part, on determination of consensus between at least two of the two or more storage nodes that the transaction is not committed.

15. The one or more non-transitory, computer-readable storage media of claim 13, wherein the respective portions of the table are stored as part of a silo.

16. The one or more non-transitory, computer-readable storage media of claim 15, wherein the respective portions of the table are partitions of the table and wherein the silo further includes an entire table.

17. The one or more non-transitory, computer-readable storage media of claim 15, wherein the respective portions of the table are partitions of the table and wherein the silo further includes one or more data blobs.

18. The one or more non-transitory, computer-readable storage media of claim 13, wherein the one or more versions of one or more records of the table are removed from one or more rowblocks.

19. The one or more non-transitory, computer-readable storage media of claim 13, storing further program instructions that when executed on or across the one or more computing devices, cause the one or more computing devices to further implement:

determining, by the one or more storage nodes, that another transaction of the one or more transactions is committed; and updating, by the one or more storage nodes, a further one or more versions of a further one or more records of the table associated with the other transaction to indicate the further one or more versions of the further one or more records are committed as part of recovering the respective portions of the table from the connection failure of the one database access application.

20. The one or more non-transitory, computer-readable storage media of claim 13, wherein a different one of the one or more database access applications that have attached respective portions of the table stored at the one or more storage nodes performs one or more access requests during the recovering of the respective portions of the table from the connection failure of the one database access application.

* * * * *